(12) United States Patent
Yokokawa et al.

(10) Patent No.: US 9,325,554 B2
(45) Date of Patent: Apr. 26, 2016

(54) RECEIVING DEVICE, RECEIVING METHOD, AND PROGRAM

(75) Inventors: Takashi Yokokawa, Kanagawa (JP); Yuken Goto, Tokyo (JP); Kenichi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 109 days.

(21) Appl. No.: 14/001,749

(22) PCT Filed: Mar. 7, 2012

(86) PCT No.: PCT/JP2012/055861
§ 371 (c)(1),
(2), (4) Date: Aug. 27, 2013

(87) PCT Pub. No.: WO2012/124575
PCT Pub. Date: Sep. 20, 2012

(65) Prior Publication Data
US 2013/0329775 A1  Dec. 12, 2013

(30) Foreign Application Priority Data

Mar. 14, 2011 (JP) .................... 2011-055380

(51) Int. Cl.
*H03D 1/00* (2006.01)
*H04L 27/06* (2006.01)
(Continued)

(52) U.S. Cl.
CPC ........ *H04L 27/2662* (2013.01); *H04L 25/0232* (2013.01); *H04L 25/03159* (2013.01);
(Continued)

(58) Field of Classification Search
CPC ............ H04B 3/32; H04B 3/23; H04B 1/123; H04B 7/002; H04B 1/109; H04L 25/03343; H04L 25/497; H04L 25/03057; H04L 1/06; H04L 25/0204
USPC .................. 375/259–285, 316–352, 354–376
See application file for complete search history.

(56) References Cited

U.S. PATENT DOCUMENTS 8,446,854 B2    5/2013  Shimizu et al.
2009/0225822 A1*  9/2009  Tupala ................ H04L 27/2659
                                                            375/226
(Continued)

FOREIGN PATENT DOCUMENTS

JP      2005-65219 A    3/2005
JP      2011-41086 A    2/2011

OTHER PUBLICATIONS

International Search Report issued Jun. 12, 2012 in PCT/JP2012/055861.

(Continued)

*Primary Examiner* — James M Perez
(74) *Attorney, Agent, or Firm* — Oblon, McClelland, Maier & Neustadt, L.L.P.

(57) ABSTRACT

The present technique relates to a receiving device, a receiving method, and a program for realizing a prompt start of data demodulation. A receiving device of one aspect of the present technique includes: a detecting unit that detects a first preamble signal from a frame signal having a frame structure that contains the first preamble signal indicating a frame partition, a second preamble signal containing control information to be used in processing a data signal, and the data signal, the second preamble signal being transmitted after the first preamble signal; an accumulating unit that accumulates the second preamble signal when the first preamble signal is detected; and a processing unit that processes the data signal based on the control information contained in the second preamble signal accumulated in the accumulating unit, the data signal being contained in the same frame as the second preamble signal accumulated in the accumulating unit. The present technique can be applied to a receiving device that receives data transmitted by an OFDM method such as DVB-T2.

7 Claims, 17 Drawing Sheets

(51) Int. Cl.
*H04L 27/26* (2006.01)
*H04L 25/02* (2006.01)
*H04L 25/03* (2006.01)
*H04L 5/00* (2006.01)

(52) U.S. Cl.
CPC ........ *H04L27/2666* (2013.01); *H04L 27/2675* (2013.01); *H04L 5/0023* (2013.01); *H04L 5/0048* (2013.01); *H04L 27/2605* (2013.01); *H04L 27/2656* (2013.01); *H04L 27/2657* (2013.01)

(56) References Cited

U.S. PATENT DOCUMENTS

| | | | |
|---|---|---|---|
| 2010/0226426 A1* | 9/2010 | Tupala et al. | 375/240.01 |
| 2010/0310022 A1* | 12/2010 | Asjadi | H04L 27/2605 375/343 |
| 2011/0013729 A1* | 1/2011 | Yuba | H04L 27/2613 375/329 |
| 2011/0019782 A1* | 1/2011 | Kobayashi | H04L 27/2659 375/344 |
| 2011/0038385 A1 | 2/2011 | Shimizu et al. | |
| 2012/0201332 A1* | 8/2012 | Vapillon | H04L 27/2685 375/340 |

OTHER PUBLICATIONS

"Frame structure channel coding and modulation for a second generation digital terrestrial television broadcasting system (DVB-T2)" Digital Video Broadcasting Bluebook A122, Jun. 2008, 157 pages with cover page.

* cited by examiner

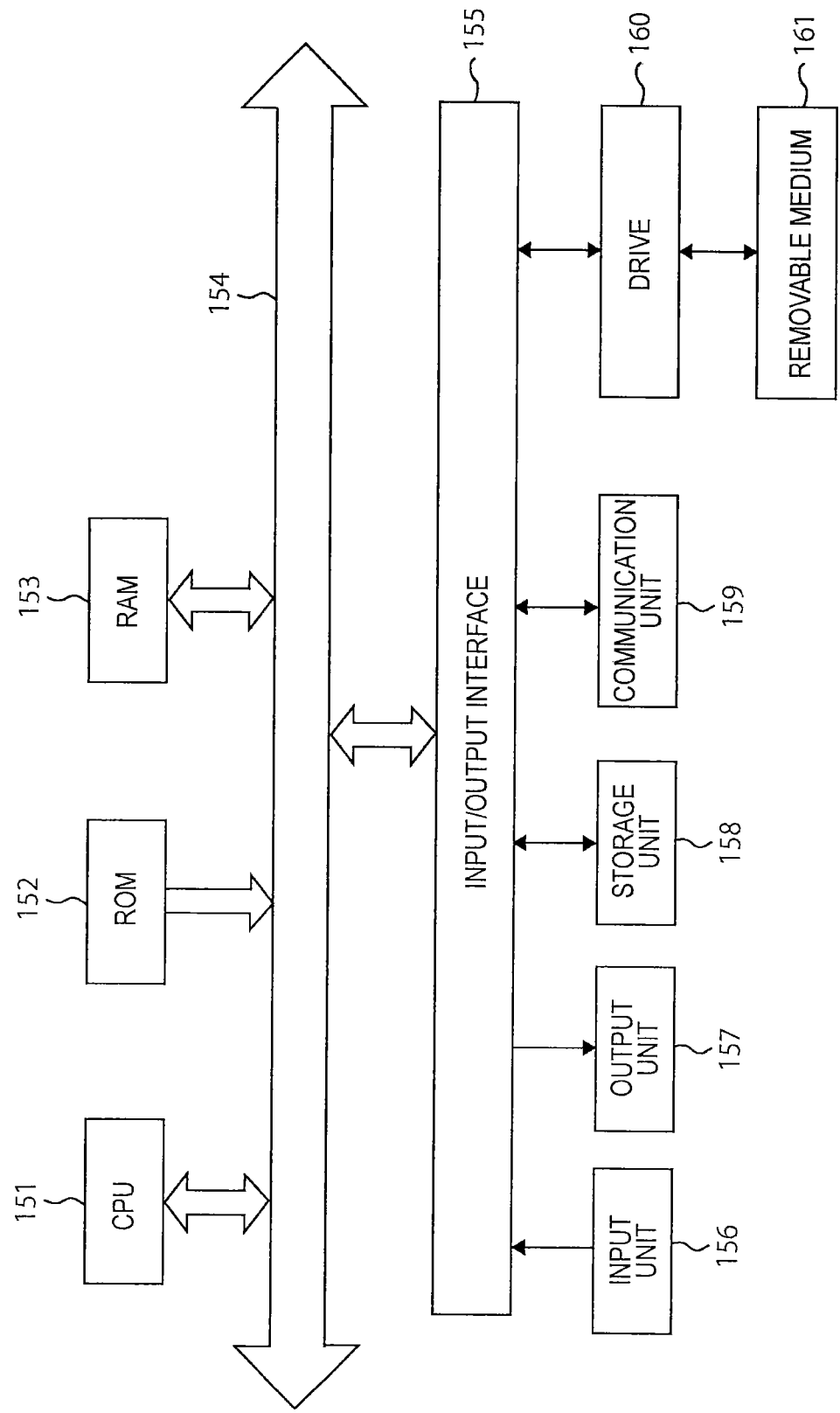

RECEIVING DEVICE, RECEIVING METHOD, AND PROGRAM

TECHNICAL FIELD

The present technique relates to receiving devices, receiving methods, and programs, and more particularly, to a receiving device, a receiving method, and a program for realizing a prompt start of data demodulation.

BACKGROUND ART

[OFDM]

In data transmission by OFDM (Orthogonal Frequency Division Multiplexing), a large number of orthogonal subcarriers are used in the transmission band, and data is allocated to the amplitude and the phase of each of the subcarriers. Data of each symbol called an OFDM symbol is transmitted. At the time of transmission, an IFFT (Inverse Fast Fourier Transform) is performed on each OFDM symbol.

FIG. 1 is a diagram showing OFDM symbols. An OFDM symbol is normally formed with an effective symbol that is a signal interval in which an IFFT is performed at the time of transmission, and a guard interval (GI) formed by copying the waveform of part of the latter half of the effective symbol and placing the copy at the top of the effective symbol.

As the guard interval is formed at the top of the OFDM symbol, resistance to multipathing can be increased. Such OFDM symbols constitute one OFDM transmission frame.

[Signaling of DVB-T2]

DVB-T2 (the second-generation digital terrestrial broadcasting standards in Europe) are digital terrestrial broadcasting standards using OFDM. According to DVB-T2, frames called T2 frames are defined, and data is transmitted by the T2 frame.

Each T2 frame contains two kinds of preamble signals called P1 and P2, and those preamble signals contain information necessary for operations such as OFDM signal demodulation.

FIG. 2 is a diagram showing the frame structure of a T2 frame. As shown in FIG. 2, one T2 frame includes a P1 symbol, P2 symbols, and data symbols (Normal or FC) in this order.

The P1 symbol is the symbol for transmitting P1 Signaling, and contains the following information a through d.
  a. Frame identification
  b. Transmission method
  c. FFT size
  d. Partial GI length The frame identification indicates whether the transmission frame is a T2 frame or a FEF (Future Extension Frame). The transmission method indicates whether the transmission method is SISO (Single Input, Single Output) or MISO (Multiple Input, Single Output). The FFT size indicates the number of points in one IFFT operation on the transmission side. The partial GI length indicates to which group the GI length being used in the symbol transmission belongs, with seven types of GI lengths being divided into two groups. That is, only the GI length group can be recognized from P1 Signaling, and, to recognize the GI length, L1PRE Signaling contained in a P2 symbol needs to be decoded.

The P2 symbols are the symbols for transmitting L1PRE Signaling and L1POST Signaling. Hereinafter, L1PRE Signaling will be referred to as L1PRE, and L1POST Signaling will be referred to as L1POST, where appropriate. L1PRE contains the information necessary for decoding L1POST, and the following control information e through g, which are necessary for demodulating a data symbol. L1POST contains parameters necessary for a receiver to access a physical layer.
  e. GI Length
  f. Time for known signal called Scattered Pilot (SP)/the interval pattern in the frequency direction
  g. The number of symbols in one frame If the information e through g of L1PRE can be decoded, the receiving device can estimate the channel characteristics by using the SP, and can perform data symbol equalization by performing interpolation in the temporal direction/the frequency direction.

As FFT sizes of the P2 symbols, the six types of sizes, 1 K, 2 K, 4 K, 8 K, 16 K, and 32 K, are defined. As GI lengths of the P2 symbols, the seven types of sizes, 1/128, 1/32, 1/16, 19/256, 1/8, 19/128, and 1/4, are defined. The same FFT size and the same GI length as the FFT size and the GI length of the symbols (Normal, FCS) other than P1 and P2 are selected for the P2 symbols.

CITATION LIST

Non-Patent Document

Non-Patent Document 1: "Frame structure channel coding and modulation for a second generation digital terrestrial television broadcasting system (DVB-T2)", DVB Document A122 June 2008

SUMMARY OF THE INVENTION

Problems to be Solved by the Invention

[Synchronizing Sequence]

The implementation guideline (IG) introduces a synchronizing sequence, with the carrier frequency errors of P1 and P2 Signaling and OFDM signals being taken into account. FIG. 3 is a diagram for explaining the synchronizing sequence according to the IG. The transverse direction in FIG. 3 represents time.

In the synchronizing sequence according to the IG, the receiving device detects a P1 symbol at the start of an operation.

After detecting a P1 symbol, the receiving device estimates a carrier frequency error. For the signal of the P1 symbol, the receiving device corrects a so-called "Fine" carrier frequency error that is smaller than a carrier interval, and corrects a so-called "Coarse" carrier frequency error that is equal to a carrier interval. After correcting the carrier frequency error, the receiving device decodes P1 Signaling from the corrected signal of the P1 symbol.

By decoding P1 Signaling, the receiving device can recognize the FFT sizes of the P2 symbols and the data symbols (NORMAL, FC).

As for the GI length, P1 Signaling contains only part of the GI length information as described above. Therefore, the receiving device cannot determine the length of the P2 symbols, and cannot recognize the end of the P2 symbols. The end of the P2 symbols is located in the boundary position between the last P2 symbol and the first data symbol in the T2 frame, as indicated by the dashed line #1 in FIG. 3.

Since the carrier frequency error estimation and the P1 Signaling decoding take time, the signal between time t2 and time t3, which is the signal of part of a P2 symbol, is not subjected to carrier frequency error correction before passing therethrough.

Therefore, the receiving device cannot demodulate the P2 symbol contained in the first T2 frame. Using the remaining symbols in the first T2 frame, the receiving device estimates the GI length necessary for demodulating the P2 symbols.

After the estimation of the GI length, the receiving device awaits the next T2 frame, and detects the top P1 symbol. The receiving device demodulates the P2 symbol that immediately follows the detected P1 symbol. In the demodulation of the P2 symbol, the FFT size recognized from P1 Signaling in the first T2 frame and the GI length estimated from the symbols in the first T2 frame are used. The receiving device can decode L1PRE by demodulating the P2 symbol. After decoding L1PRE, the receiving device decodes L1POST, and can demodulate the data symbols by using the decoded L1PRE and L1POST information.

In the above described synchronizing sequence of the IG, a P2 symbol contained in the first T2 frame cannot be demodulated, and therefore, a delay equivalent to one T2 frame is caused before synchronization is established. According to DVB-T2, the time of one T2 frame is 250 ms at a maximum, and loss of 250 ms at a maximum is caused between the start of demodulation and the end of the demodulation of the data symbols. Where synchronization is established, decoding of L1PRE and L1POST has been completed, and the data symbols can be demodulated.

The present technique has been developed in view of those circumstances, and an object thereof is to realize a prompt start of data demodulation.

Solutions to Problems

A receiving device of one aspect of the present technique includes: a detecting unit that detects a first preamble signal from a frame signal having a frame structure that contains the first preamble signal indicating a frame partition, a second preamble signal containing control information to be used in processing a data signal, and the data signal, the second preamble signal being transmitted after the first preamble signal; an accumulating unit that accumulates the second preamble signal when the first preamble signal is detected; and a processing unit that processes the data signal based on the control information contained in the second preamble signal accumulated in the accumulating unit, the data signal being contained in the same frame as the second preamble signal accumulated in the accumulating unit.

The first preamble signal may be located at the top of the frame or may be located in a position other than the top.

The accumulating unit may accumulate the amount of data equivalent to the largest possible data amount as the data amount of the second preamble signal, the data being located immediately after the first preamble signal.

The frame signal may be a signal of a T2 frame compliant with DVB-T2, the first preamble signal may be a signal of a P1 symbol, the second preamble signal may be a signal of a P2 symbol, and the data signal may be a signal of a data symbol.

The receiving device may further include: an estimating unit that estimates the GI length of the symbols forming the T2 frame based on part of the signal of the T2 frame; and a control unit that determines the data amount of the P2 symbol based on the FFT size indicated by information contained in the P1 symbol and the GI length estimated by the estimating unit, and reads a signal having the determined data amount as the signal of the P2 symbol from the accumulating unit.

The processing unit may include: a FFT operation unit that performs a FFT operation on the signal of the P2 symbol read from the accumulating unit, the start position of the FFT operation being a position that is behind the position of the P1 symbol by the GI length estimated by the estimating unit, the FFT interval being an interval that starts from the start position and has a size equivalent to the FFT size; an equalizing unit that performs equalization on the signal of the P2 symbol of a frequency range obtained through the FFT operation; and a decoding unit that decodes L1PRE Signaling and L1POST Signaling from the equalized signal of the P2 symbol.

The processing unit may not be formed with the FFT operation unit, the equalizing unit, and the decoding unit, but may be formed with at least one of the FFT operation unit, the equalizing unit, and the decoding unit.

The receiving device may further include a searching unit that searches for the FFT interval based on the signal of the P2 symbol of the frequency range. In this case, when the search by the searching unit is completed, the control unit may re-read the signal of the P2 symbol from the accumulating unit, and the FFT operation unit may perform the FFT operation on the signal within the FFT interval detected by the search, the signal within the FFT interval being of the re-read signal of the P2 symbol.

The equalizing unit may include: a channel characteristics estimating unit that extracts a pilot signal from the signal of the P2 symbol of the frequency range, and estimates the channel characteristics of the subcarrier at the location of the pilot signal; an interpolating unit that performs interpolation on the channel characteristics estimated by the channel characteristics estimating unit, using an interpolation filter; and a correcting unit that corrects a distortion of the signal of the P2 symbol of the frequency range based on the channel characteristics of all the subcarriers determined through the interpolation performed by the interpolating unit. In this case, the receiving device may further include a searching unit that searches for the center position of the filter passband of the interpolation filter based on the signal of the P2 symbol of the frequency range. When the search by the searching unit is completed, the control unit may re-read the signal of the P2 symbol from the accumulating unit, the FFT operation unit may perform the FFT operation on the re-read signal of the P2 symbol, and the interpolating unit may perform the interpolation on the channel characteristics, with the center position of the filter passband of the interpolation filter being the center position detected by the searching unit.

In the first aspect of the present technique, a first preamble signal is detected from a frame signal having a frame structure that contains the first preamble signal indicating a frame partition, a second preamble signal that is transmitted after the first preamble signal and contains the control information to be used in processing a data signal, and the data signal. When the first preamble signal is detected, the second preamble signal is accumulated. The data signal contained in the same frame as the accumulated second preamble signal is processed based on the control information contained in the accumulated second preamble signal.

Effects of the Invention

According to the present technique, data demodulation can be promptly started.

BRIEF DESCRIPTION OF DRAWINGS

FIG. 17 is a block diagram showing an example structure of computer hardware.

MODES FOR CARRYING OUT THE INVENTION

The following is a description of embodiments for carrying out the present technique. Explanation will be made in the following order.

1. First embodiment (an example for realizing high-speed establishment of synchronization)
2. Second embodiment (an example for realizing high-speed establishment of synchronization and improved synchronization performance)

First Embodiment

Figure 1:
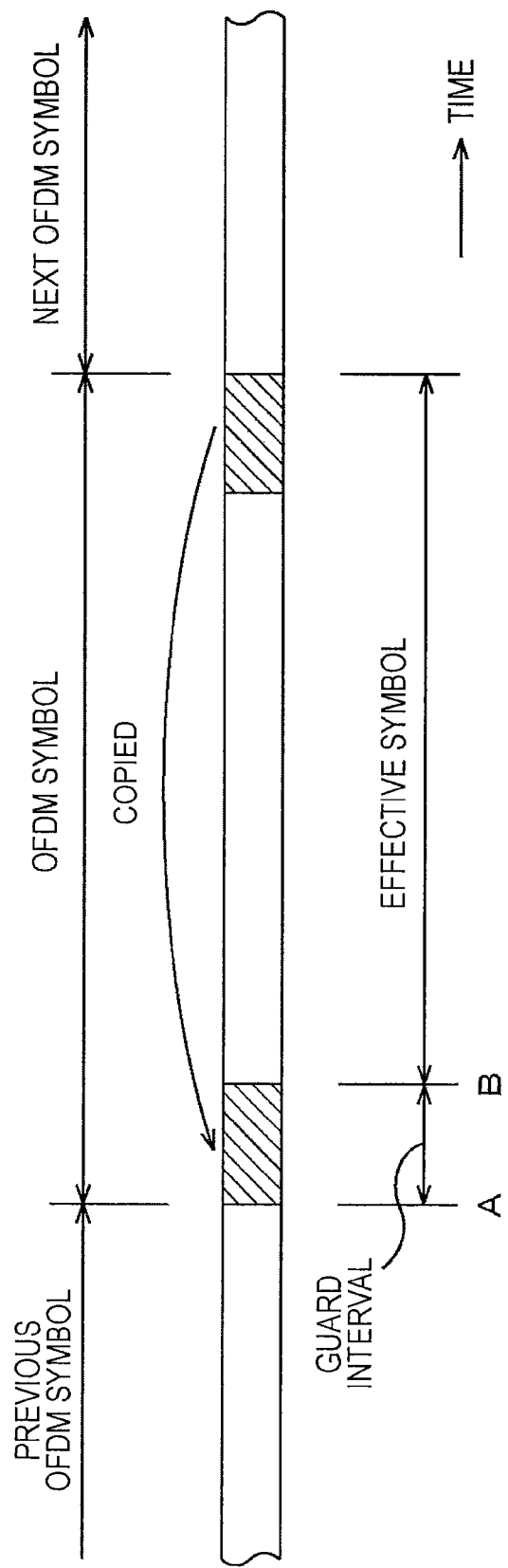
FIG. 1 is a diagram showing OFDM symbols.
Figure 2:
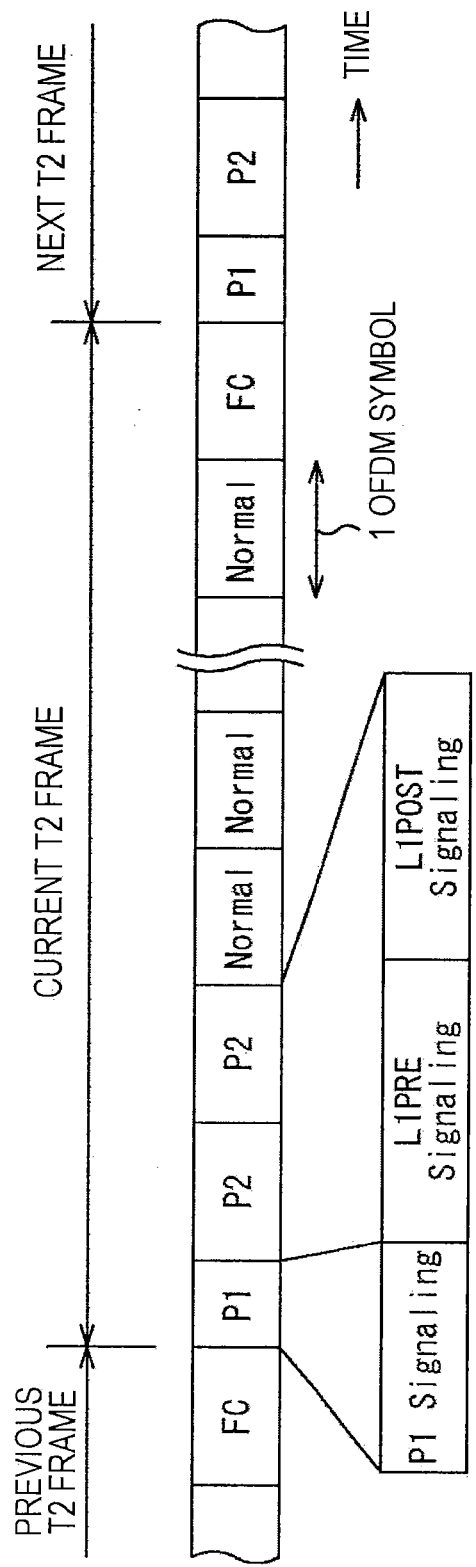
FIG. 2 is a diagram showing the frame structures of T2 frames.
Figure 3:
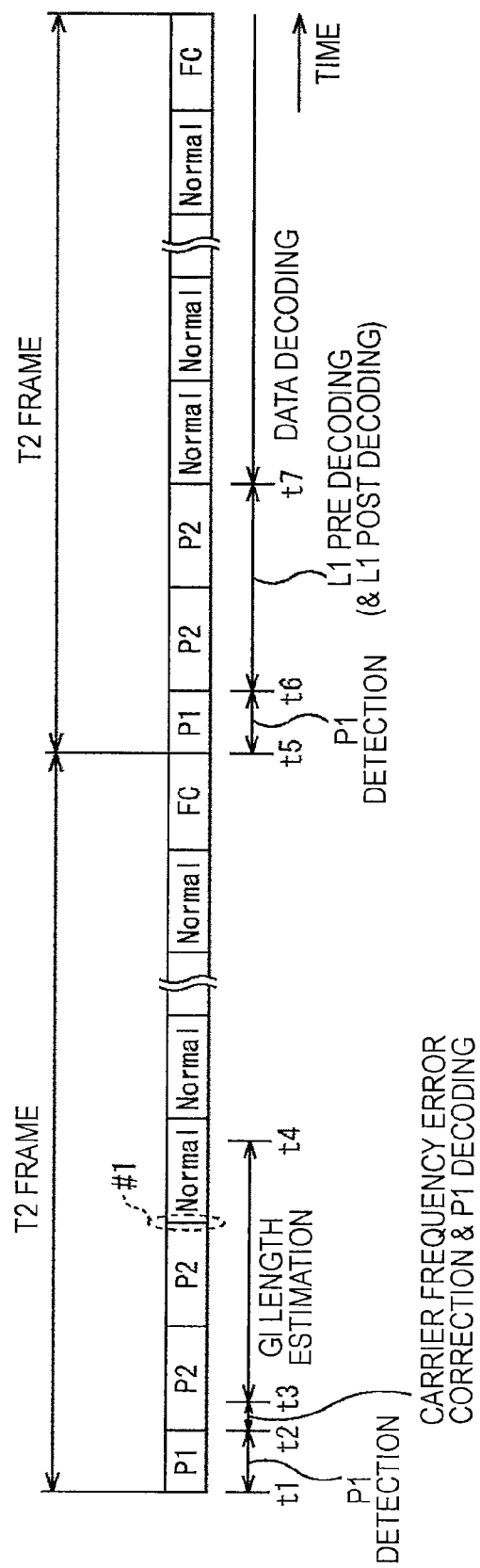
FIG. 3 is a diagram for explaining a synchronizing sequence according to the IG.
Figure 4:
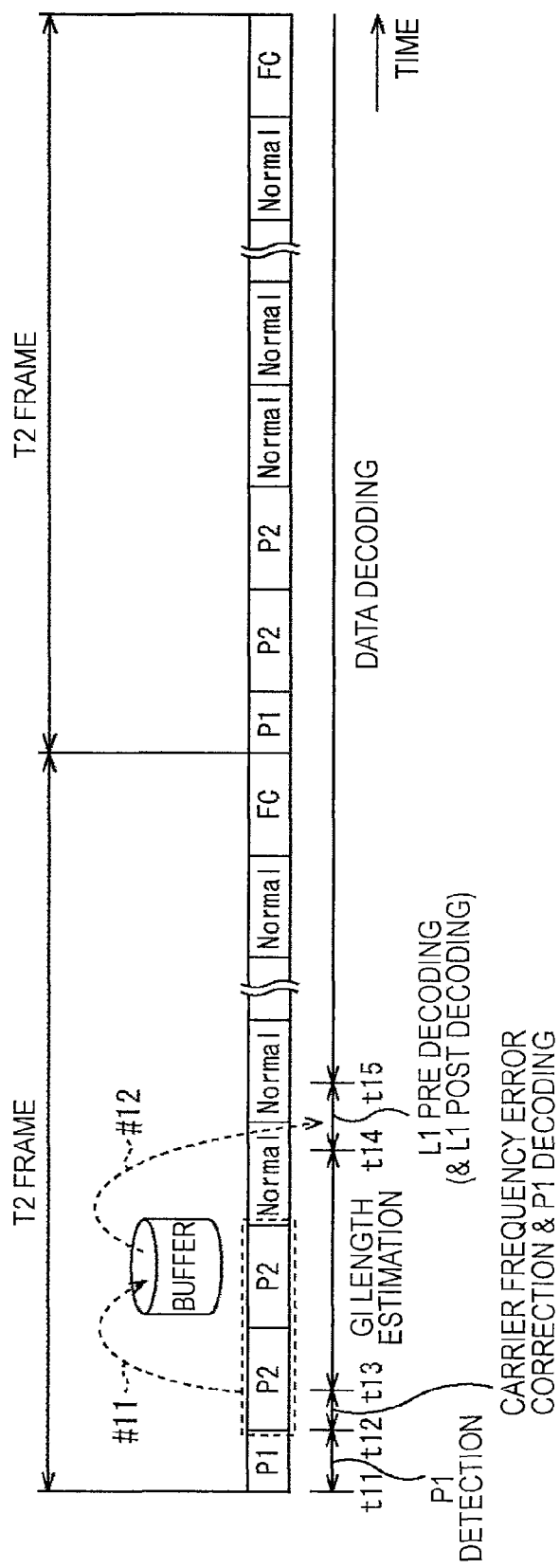
FIG. 4 is a diagram for explaining a synchronizing sequence in a receiving device according to an embodiment of the present technique.

FIG. 4 is a diagram for explaining a synchronizing sequence in a receiving device according to an embodiment of the present technique.

The receiving device detects a P1 symbol at the start of an operation. In the example illustrated in FIG. 4, the P1 symbol is detected in the period between time t11 and time t12.

At time t12 after the P1 symbol is detected, the receiving device starts accumulating the data equivalent to P2 symbols in a buffer immediately after the P1 symbol, as indicated by the arrow #11. At the same time as the accumulation of data in the buffer, the receiving device also corrects a carrier frequency error and decodes P1 signaling, as in the synchronizing sequence according to the IG.

Specifically, the receiving device estimates a carrier frequency error. For the signal of the P1 symbol, the receiving device corrects a so-called "Fine" carrier frequency error that is smaller than a carrier interval, and corrects a so-called "Coarse" carrier frequency error that is equal to a carrier interval. After correcting the carrier frequency error, the receiving device decodes P1 Signaling from the signal of the P1 symbol having the carrier frequency error corrected. In the example illustrated in FIG. 4, at the same time as the operation to accumulate data in the buffer, the carrier frequency error correction and the P1 Signaling decoding are performed in the period between time t12 and time t13.

After decoding P1 Signaling, the receiving device determines the data amount equivalent to the P2 symbols based on the FFT size recognized from the decoding of P1 signaling. The method of determining a P2 write amount representing the data amount equivalent to the P2 symbols will be described later. When accumulating the P2 write amount of data in the buffer, the receiving device ends the accumulation of data in the buffer.

After decoding P1 Signaling, the receiving device also estimates the GI length by using the rest of the symbols, at the same time as the operation to accumulate data in the buffer. In the example illustrated in FIG. 4, the GI length estimation is performed in the period between time t13 and time t14.

At time t14 at which the GI estimation is completed, the receiving device reads the data accumulated in the buffer, as indicated by the arrow #12. As will be described later in detail, the P2 readout amount representing the data readout amount is determined by using the estimated GI length.

The receiving device performs carrier frequency error correction on the P2 symbol signal, which is the data read from the buffer, and performs a FFT operation and equalization. The receiving device also decodes L1PRE and L1POST from the equalized P2 symbol signal. In the example illustrated in FIG. 4, the decoding of L1PRE and L1POST is performed in the period between time t14 and time t15.

When succeeding in decoding L1PRE and L1POST, the receiving device starts demodulating the data symbols after time t15 at which the decoding of L1PRE and L1POST is completed, by using the information contained in the decoded L1PRE and L1POST. When failing in decoding L1PRE and L1POST, the receiving device performs the same operations as above on the next T2 frame.

Accordingly, without having to await the next T2 frame, the receiving device can decode L1PRE and L1POST based on the data accumulated in the buffer, and can start demodulating the data symbols contained in the first T2 frame. That is, high-speed synchronization can be realized.

[Structure of a Receiving Device]

Figure 5:
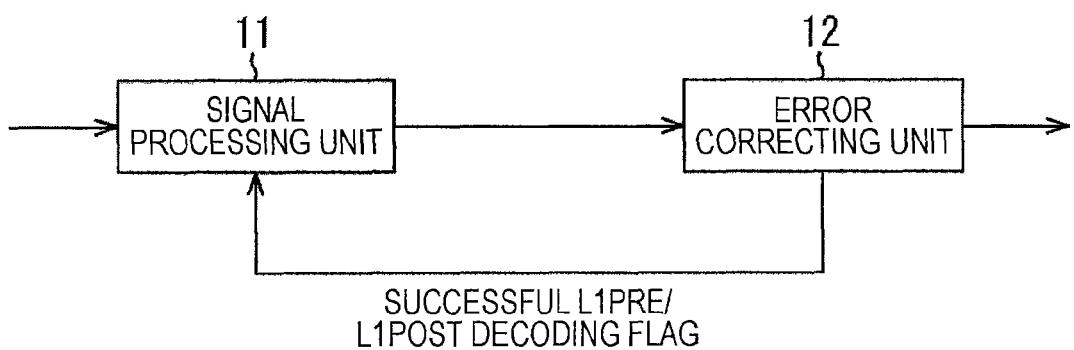
FIG. 5 is a block diagram showing an example structure of a receiving device according to an embodiment of the present technique.

FIG. 5 is a block diagram showing an example structure of a receiving device according to an embodiment of the present technique.

The receiving device 1 shown in FIG. 5 is formed with a signal processing unit 11 and an error correcting unit 12. An OFDM signal that is compliant with DVB-T2 and is obtained by performing an A-D conversion and orthogonal demodulation on a received signal is input to the signal processing unit 11. The OFDM signal that is input to the signal processing unit 11 is a baseband signal of a time domain before an FFT operation, and contains a real-axis component (I component) and an imaginary-axis component (Q component).

The signal processing unit 11 establishes synchronization by performing the operations according to the synchronizing sequence described with reference to FIG. 4. The signal processing unit 11 performs operations such as carrier frequency error correction, an FFT operation on the corrected OFDM signal, and equalization of the OFDM signal in the frequency band obtained through the FFT operation. The signal processing unit 11 outputs the equalized OFDM signal to the error correcting unit 12.

The error correcting unit 12 performs error correcting decoding on the equalized OFDM signal supplied from the signal processing unit 11, and outputs decoded data. When succeeding in decoding L1PRE and L1POST transmitted through P2 symbols, the error correcting unit 12 outputs a successful L1PRE/L1POST decoding flag indicating that the decoding of L1PRE and L1POST is successful, to the signal processing unit 11.

In the following description, "demodulation" means operations up to the equalization performed by the signal processing unit 11, and "decoding" means the error correcting decoding performed by the error correcting unit 12, excluding the decoding of P1 Signaling.

Figure 6:
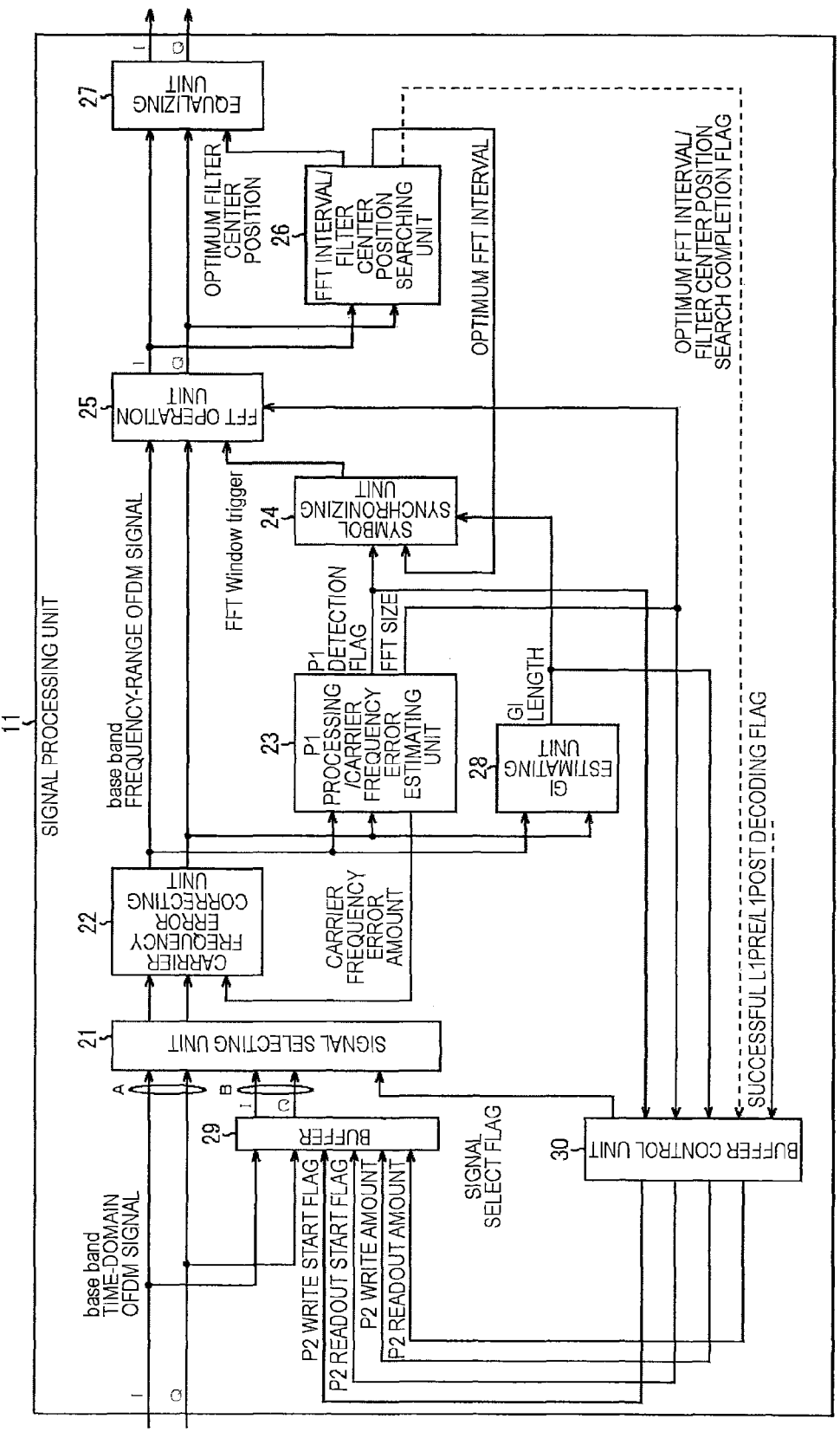
FIG. 6 is a block diagram showing an example structure of the signal processing unit.

FIG. 6 is a block diagram showing an example structure of the signal processing unit 11.

The signal processing unit 11 includes a signal selecting unit 21, a carrier frequency error correcting unit 22, a P1 processing/carrier frequency error estimating unit 23, a symbol synchronizing unit 24, a FFT operation unit 25, a FFT interval/filter center position searching unit 26, an equalizing unit 27, a GI estimating unit 28, a buffer 29, and a buffer control unit 30. A time-domain OFDM signal is input to the signal selecting unit 21 and the buffer 29.

When a demodulating operation is started, the signal selecting unit 21 selects a time-domain OFDM signal (signal A) that is input from outside the signal processing unit 11, and outputs the time-domain OFDM signal to the carrier frequency error correcting unit 22.

In a case where a signal select flag indicating selection of a time-domain OFDM signal that is read from the buffer 29 is supplied, the signal selecting unit 21 selects the time-domain OFDM signal (signal B) read from the buffer 29, and outputs the time-domain OFDM signal to the carrier frequency error correcting unit 22. The signal select flag indicating selection of the time-domain OFDM signal read from the buffer 29 is supplied from the buffer control unit 30 when the GI length estimation using the symbols contained in the first T2 frame is completed.

In accordance with a carrier frequency error amount estimated by the P1 processing/carrier frequency error estimating unit 23, the carrier frequency error correcting unit 22 corrects the carrier frequency error contained in the time-domain OFDM signal supplied from the signal selecting unit 21, and outputs the corrected time-domain OFDM signal. The corrected time-domain OFDM signal that is output from the carrier frequency error correcting unit 22 is supplied to the P1 processing/carrier frequency error estimating unit 23, the FFT operation unit 25, and the GI estimating unit 28.

The P1 processing/carrier frequency error estimating unit 23 detects a P1 symbol from the time-domain OFDM signal supplied from the carrier frequency error correcting unit 22. When detecting the P1 symbol, the P1 processing/carrier frequency error estimating unit 23 outputs a P1 detection flag indicating the position of the P1 symbol to the symbol synchronizing unit 24 and the buffer control unit 30. The P1 processing/carrier frequency error estimating unit 23 also decodes P1 Signaling, and outputs the FFT size information contained in P1 Signaling to the FFT operation unit 25 and the buffer control unit 30.

The P1 processing/carrier frequency error estimating unit 23 estimates a carrier frequency error based on the time-domain OFDM signal supplied from the carrier frequency error correcting unit 22. For example, the P1 processing/carrier frequency error estimating unit 23 determines an autocorrelation that is the mean value of the product of the time-domain OFDM signal supplied from the carrier frequency error correcting unit 22 and a delayed signal generated by delaying the time-domain OFDM signal by the effective symbol length during a predetermined period of time. The autocorrelation determined in this manner has a peak value on the boundary between OFDM symbols.

The phase of the autocorrelation having a peak value is 0 in a case where the frequency of the carriers to be used in digital orthogonal demodulation is exactly the same as the center frequency of the OFDM signal (the received OFDM signal) to be subjected to the digital orthogonal demodulation. However, in a case where the frequency of the carriers to be used in the digital orthogonal demodulation differs from the center frequency of the OFDM signal to be subjected to the digital orthogonal demodulation, the phase of the autocorrelation having a peak value rotates by the amount equivalent to the difference.

In view of this, the phase of the autocorrelation having a peak value represents the difference between the frequency of the carriers to be used in digital orthogonal demodulation and the center frequency of the OFDM signal to be subjected to the digital orthogonal demodulation. The P1 processing/carrier frequency error estimating unit 23 estimates a carrier frequency error based on the phase of the autocorrelation having a peak value, and outputs the carrier frequency error amount to the carrier frequency error correcting unit 22.

Before synchronization is established, the symbol synchronizing unit 24 determines the top of effective symbols to be in a position that is ahead of the position represented by the P1 detection flag supplied from the P1 processing/carrier frequency error estimating unit 23, by a GI length estimated by the GI estimating unit 28. The symbol synchronizing unit 24 sets the top of the effective symbols as the start position of the FFT operation to be performed on the P2 symbols, and outputs a FFT Window trigger indicating the position to the FFT operation unit 25. As described above, where synchronization is established, decoding of L1PRE and L1POST has been completed, and the data symbols can be demodulated.

After synchronization is established, the symbol synchronizing unit 24 determines the start position of a FFT interval to be subjected to the FFT operation for the signal of each symbol on the basis of the position indicated by the P1 detection flag supplied from the P1 processing/carrier frequency error estimating unit 23. Information such as the GI length contained in L1PRE decoded by the error correcting unit 12 is supplied to the symbol synchronizing unit 24 via a path (not shown), and is used in determining the start position of the FFT interval. The symbol synchronizing unit 24 outputs a FFT Window trigger indicating the determined position to the FFT operation unit 25. Where appropriate, the symbol synchronizing unit 24 outputs a FFT Window trigger indicating the start position of a FFT interval determined by the FFT interval/filter center position searching unit 26, to the FFT operation unit 25.

The FFT operation unit 25 performs a FFT operation on the time-domain OFDM signal supplied from the carrier frequency error correcting unit 22. The FFT interval to be subjected to the FFT operation is determined based on the FFT Window trigger supplied from the symbol synchronizing unit 24 and the FFT size recognized by the P1 processing/carrier frequency error estimating unit 23 based on P1 Signaling, for example. The FFT operation unit 25 outputs the OFDM signal of the frequency range obtained through the FFT operation, to the FFT interval/filter center position searching unit 26 and the equalizing unit 27.

Based on the frequency-range OFDM signal supplied from the FFT operation unit 25, the FFT interval/filter center position searching unit 26 searches for the FFT interval, and outputs the information about the FFT interval determined by the search to the symbol synchronizing unit 24. The FFT interval/filter center position searching unit 26 also searches for the center position of the filter passband of the interpolation filter used at the equalizing unit 27, and outputs the information about the center position determined by the search to the equalizing unit 27.

For example, the FFT interval/filter center position searching unit 26 performs equalization on the frequency-range OFDM signal in the same manner as the equalizing unit 27, and detects the signal quality after the equalization. If the detected signal quality is equal to or higher than a threshold, the FFT interval/filter center position searching unit 26 determines the center position of the interpolation filter used in the equalization to be the optimum center position, and determines the currently set FFT interval to be the optimum FFT interval.

If the detected signal quality is lower than the threshold, on the other hand, the FFT interval/filter center position searching unit 26 sets a new FFT interval that differs from the currently set FFT interval, and outputs the information to the symbol synchronizing unit 24 to cause the FFT operation unit 25 to perform a FFT operation. With the center position of the interpolation filter being changed, the FFT interval/filter center position searching unit 26 also performs equalization on the frequency-range OFDM signal obtained through the FFT operation performed on the new FFT interval, and detects the signal quality after the equalization. By repeatedly performing the above operation, the FFT interval/filter center position searching unit 26 determines the optimum FFT interval and the optimum center position of the filter passband of the interpolation filter.

The search for a FFT interval and the search for the center position of the filter passband of the interpolation filter used in equalization are disclosed in Japanese Patent Application Laid-Open Nos. 2009-232439 and 2010-74578, for example.

The equalizing unit 27 performs equalization on the frequency-range OFDM signal supplied from the FFT operation unit 25. For example, the equalizing unit 27 extracts a SP signal (scattered pilot signal) from the frequency-range OFDM signal, and estimates the channel characteristics of the subcarrier at the location of the SP signal. The equalizing unit 27 estimates the channel characteristics of each carrier of the OFDM signal by performing interpolation on the estimated channel characteristics in the temporal direction and the frequency direction. The center position determined by the FFT interval/filter center position searching unit 26 is used as the center position of the filter passband of the interpolation filter used in interpolation performed on the channel characteristics in the frequency direction.

Based on the estimated channel characteristics, the equalizing unit 27 corrects amplitude and phase errors contained in the frequency-range OFDM signal, and performs equalization. The equalizing unit 27 outputs the equalized OFDM signal to the error correcting unit 12.

Before synchronization is established, the GI estimating unit 28 estimates the GI length based on the time-domain OFDM signal supplied from the carrier frequency error correcting unit 22. For example, the GI estimating unit 28 determines the correlation value between the part of the latter half of the effective symbol used as the original of the GI and each component of the OFDM symbol, and detects the portion with a high correlation value as the GI. The GI estimating unit 28 outputs GI length information indicating the detected GI length to the symbol synchronizing unit 24 and the buffer control unit 30.

When a P2 write start flag is supplied from the buffer control unit 30, the buffer 29 starts accumulating a time-domain OFDM signal that is the data of P2 symbols and is input from outside the signal processing unit 11. The buffer 29 continues to accumulate the time-domain OFDM signal, until the amount of data equivalent to a P2 write amount supplied from the buffer control unit 30 after the supply of the P2 write start flag has been accumulated.

When a P2 readout start flag is supplied from the buffer control unit 30, the buffer 29 starts reading out the accumulated time-domain OFDM signal, and outputting the time-domain OFDM signal to the signal selecting unit 21. The buffer 29 continues to read out and output the time-domain OFDM signal until the amount of data equivalent to a P2 readout amount supplied together with the P2 readout start flag from the buffer control unit 30 has been output.

When a P1 detection flag is supplied from the P1 processing/carrier frequency error estimating unit 23, the buffer control unit 30 outputs the P2 write start flag to the buffer 29.

When the decoding of P1 Signaling has been completed at the P1 processing/carrier frequency error estimating unit 23, and FFT size information is supplied, the buffer control unit 30 determines the P2 write amount according to the following equation (1).

$$P2\text{ write amount} = (\text{FFT size} + \text{maximum GI length}) \times \text{the number of } P2 \text{ symbols} \quad (1)$$

In the example case illustrated in FIG. 4, the number of P2 symbols is two. The FFT size in the equation (1) is the FFT size recognized by the P1 processing/carrier frequency error estimating unit 23 from P1 Signaling. The maximum GI length in the equation (1) is the longest possible GI length.

According to DVB-T2, where the transmission method is SISO, the maximum GI length is $19/128$ when the FFT size is 32 K, and the maximum GI length is $1/4$ when the FFT size is 16 K, 8 K, 4 K, 2 K, or 1 K. In this manner, the longest possible GI length is specified in accordance with FFT size. Where the transmission method is MISO, the maximum GI length is $19/256$ when the FFT size is 32 K, the maximum GI length is $19/128$ when the FFT size is 16 K or 8 K, and the maximum GI length is $1/8$ when the FFT size is 4 K or 1 K.

Since the GI length is still unknown even when the decoding of P1 Signaling is completed, the buffer control unit 30 determines the P2 write amount on the assumption that the GI length of the P2 symbols is the maximum GI length. For example, in a case where 32 K is recognized as the FFT size by the P1 processing/carrier frequency error estimating unit 23, the buffer control unit 30 uses $19/128$ as the GI length, and determines the P2 write amount based on the equation (1).

As the maximum GI length or the largest possible data amount as the data amount of the P2 symbols is estimated in the above manner, at least the data of the P2 symbols is stored in the buffer 29, regardless of the actual GI length recognized from L1PRE. The buffer control unit 30 outputs the information about the P2 write amount determined in the above manner to the buffer 29.

When GI length information is supplied from the GI estimating unit 28, the buffer control unit 30 determines the P2 readout amount according to the following equation (2).

$$P2\text{ readout amount} = (\text{FFT size} + \text{GI length}) \times \text{the number of } P2 \text{ symbols} \quad (2)$$

The FFT size in the equation (2) is the FFT size recognized by the P1 processing/carrier frequency error estimating unit 23 from P1 Signaling. The GI length in the equation (2) is the GI length estimated by the GI estimating unit 28. The buffer control unit 30 outputs the information about the P2 readout amount determined in the above manner, together with the P2 readout start flag, to the buffer 29.

When GI length information is supplied from the GI estimating unit 28, the buffer control unit 30 outputs a signal select flag indicating selection of a time-domain OFDM signal that is read from the buffer 29, to the signal selecting unit 21. When a successful L1PRE/L1POST decoding flag is supplied from the error correcting unit 12, the buffer control unit 30 outputs a signal select flag indicating selection of a time-domain OFDM signal that is input from outside, to the signal selecting unit 21.

[Operations of the Receiving Device]

Figure 7:
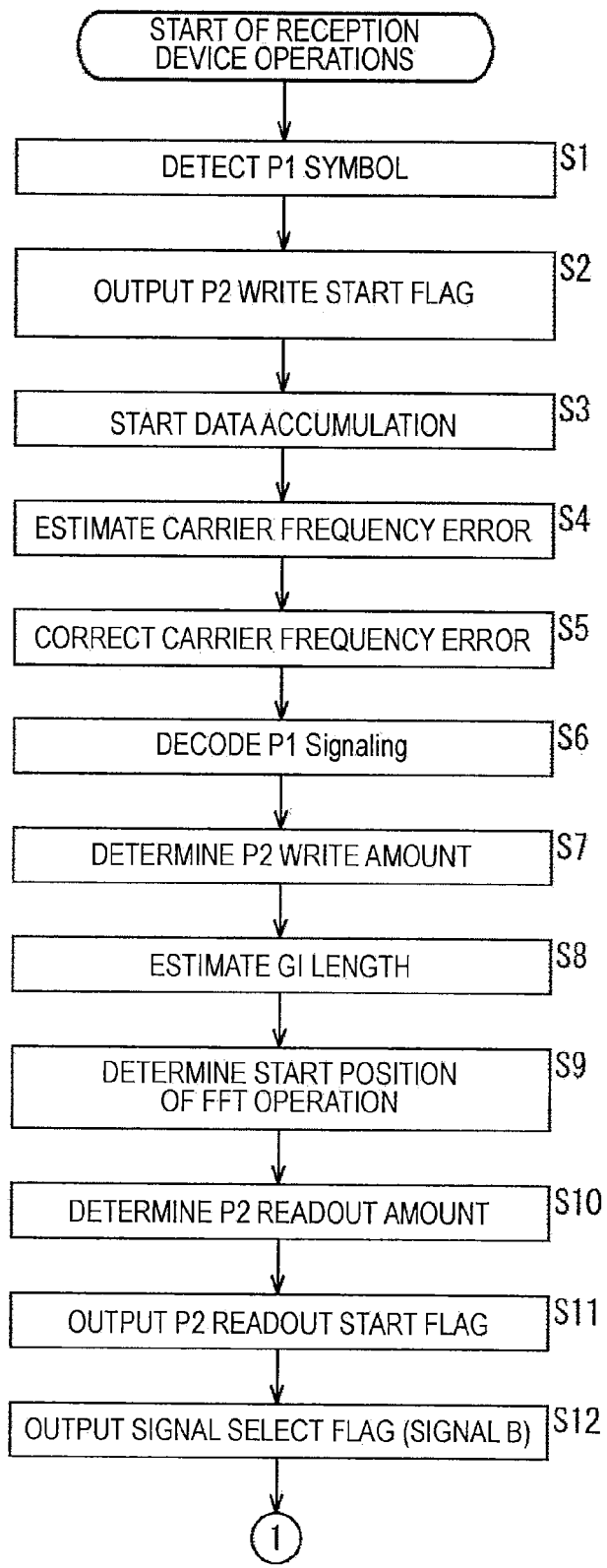
FIG. 7 is a flowchart for explaining operations of the receiving device.
Figure 8:
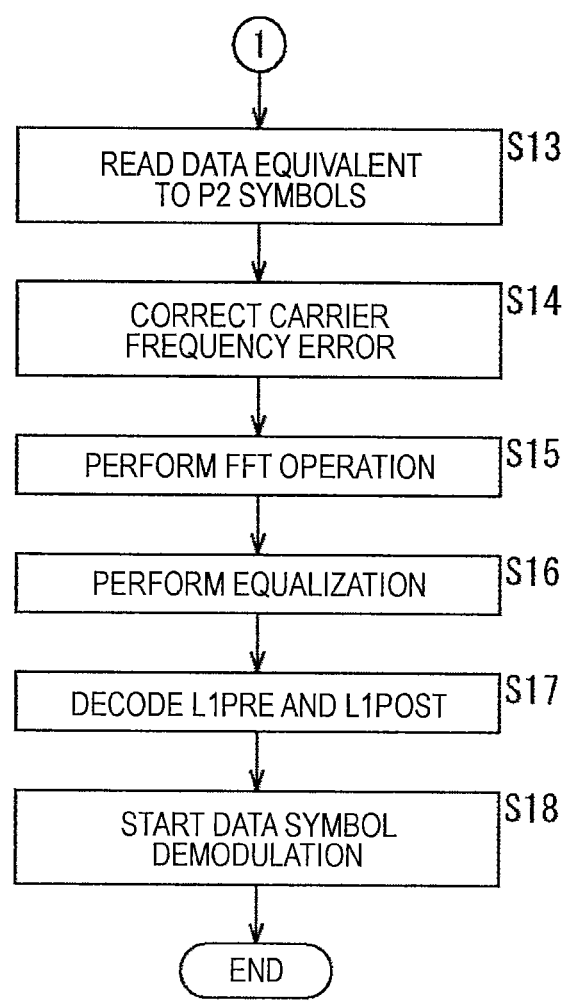
FIG. 8 is a flowchart for explaining operations of the receiving device, continued from FIG. 7.

Referring now to the flowchart shown in FIGS. 7 and 8, operations to be performed by the receiving device 1 are described. The operation in each step is performed in parallel with the operation of another step, or is performed before or after the operation of another step, where appropriate.

The operations are started when the time-domain OFDM signal of the first T2 frame after the start of a demodulating operation is input to the signal processing unit 11. At the start of the demodulating operation, the signal selecting unit 21 selects the input time-domain OFDM signal. The time-domain OFDM signal selected by the signal selecting unit 21 is supplied to the P1 processing/carrier frequency error estimating unit 23 via the carrier frequency error correcting unit 22.

In step S1, the P1 processing/carrier frequency error estimating unit 23 detects a P1 symbol from the time-domain OFDM signal, and outputs a P1 detection flag.

In step S2, the buffer control unit 30 outputs a P2 write start flag to the buffer 29, in response to the supply of the P1 detection flag.

In step S3, the buffer 29 starts accumulating the time-domain OFDM signal that is input from outside.

In step S4, the P1 processing/carrier frequency error estimating unit 23 estimates a carrier frequency error based on the time-domain OFDM signal, and outputs the carrier frequency error amount to the carrier frequency error correcting unit 22.

In step S5, the carrier frequency error correcting unit 22 corrects the carrier frequency error contained in the time-domain OFDM signal in accordance with the carrier frequency error amount supplied from the P1 processing/carrier frequency error estimating unit 23.

In step S6, the P1 processing/carrier frequency error estimating unit 23 decodes P1 Signaling from the detected 21 symbol of the first T2 frame, and outputs FFT size information.

In step S7, the buffer control unit 30 determines a P2 write amount according to the above equation (1) by using the FFT size recognized by the P1 processing/carrier frequency error estimating unit 23, and outputs the information about the P2 write amount to the buffer 29. The accumulation of the time-domain OFDM signal by the buffer 29 is continued until the amount of data equivalent to the P2 write amount has been accumulated.

In step S8, the GI estimating unit 28 estimates the GI length based on the time-domain OFDM signal supplied from the carrier frequency error correcting unit 22.

In step S9, the symbol synchronizing unit 24 determines the start position of a FFT operation for the P2 symbol signal based on the position of the 21 symbol detected by the 21 processing/carrier frequency error estimating unit 23 and the GI length estimated by the GI estimating unit 28. The symbol synchronizing unit 24 outputs a FFT Window trigger indicating the start position of the FFT operation to the FFT operation unit 25.

In step S10, based on the FFT size recognized by the P1 processing/carrier frequency error estimating unit 23 and the GI length estimated by the GI estimating unit 28, the buffer control unit 30 determines a P2 readout amount according to the above equation (2).

In step S11, the buffer control unit 30 outputs the information about the P2 readout amount, together with a P2 readout start flag, to the buffer 29.

In step S12, the buffer control unit 30 outputs a signal select flag indicating selection of a time-domain OFDM signal that is read from the buffer 29, to the signal selecting unit 21.

In step S13, the buffer 29 starts reading out the accumulated time-domain OFDM signal. The readout of the time-domain OFDM signal by the buffer 29 is continued until the OFDM signal equivalent to the P2 readout amount has been read out. The P2 symbol signal that is the time-domain OFDM signal read from the buffer 29 is selected by the signal selecting unit 21, and is supplied to the carrier frequency error correcting unit 22.

In step S14, the carrier frequency error correcting unit 22 corrects the carrier frequency error contained in the P2 symbol signal read from the buffer 29.

In step S15, the FFT operation unit 25 performs a FFT operation on the P2 symbol signal having the carrier frequency error corrected, and outputs a frequency-range P2 symbol signal.

In step S16, the equalizing unit 27 performs equalization on the P2 symbol signal supplied from the FFT operation unit 25.

In step S17, the error correcting unit 12 decodes L1PRE and L1POST from the equalized P2 symbol signal. When having successfully decoded L1PRE and L1POST, the error correcting unit 12 outputs a successful L1PRE/L1POST decoding flag. The successful L1PRE/L1POST decoding flag is input to the buffer control unit 30.

In step S18, the signal processing unit 11 starts demodulating the data symbols contained in the first T2 frame, using the information obtained through the decoding of L1PRE and L1POST. Specifically, in accordance with a signal select flag supplied from the buffer control unit 30, the signal selecting unit 21 selects a data symbol signal that is input from outside. The carrier frequency error correcting unit 22 corrects the carrier frequency error contained in the data symbol signal selected by the signal selecting unit 21.

The symbol synchronizing unit 24 determines the start position of a FFT interval based on the position of the detected P1 symbol and the GI length recognized from L1PRE, for example, and outputs a FFT Window trigger to the FFT operation unit 25. The FFT operation unit 25 sets an FFT interval starting from the start position determined by the symbol synchronizing unit 24. The FFT interval has the FFT size recognized from P1 Signaling. The FFT operation unit 25 then performs a FFT operation on the data symbol signal supplied from the carrier frequency error correcting unit 22. The equalizing unit 27 performs equalization on the frequency-range data symbol signal obtained through the FFT operation. The error correcting unit 12 decodes data based on the equalized data symbol signal. For example, at least one of the FFT operation unit 25, the equalizing unit 27, and the error correcting unit 12 forms the processing unit that processes the data symbols contained in the T2 frame that contains the P2 symbols accumulated in the buffer 29.

Through the above described operation, synchronization can be promptly established, and demodulation can be started from the data symbols contained in the first T2 frame.

In the above description, demodulation is started from the data symbol having L1PRE and L1POST decoded among the data symbols in the first T2 frame. However, the data of the first data symbol in the T2 frame and the data symbols transmitted before the decoding of L1PRE and L1POST is completed may be accumulated in the buffer 29, and the accumulated data may be read from the buffer 29 when the decoding of L1PRE and L1POST is completed, so that demodulation can be started from the first data symbol.

In this case, the data of the first data symbol and the second data symbol contained in the first T2 frame is accumulated in the buffer 29 in the example illustrated in FIG. 4. After time t15 at which the decoding of L1PRE and L1POST is completed, the data is sequentially read from the buffer 29, and demodulation is started from the first data symbol. Although the capacity of the buffer 29 needs to be made larger, demodulation can be started from the first data symbol contained in the T2 frame with this arrangement.

In a case where a spectral inversion can be detected at the same time as the estimation of a carrier frequency error, the spectral inversion may also be corrected when the carrier frequency error is corrected. In this manner, even in a case where a spectral inversion has occurred, synchronization can be established with the same timing as in a case where no spectral inversions have occurred.

Second Embodiment

Figure 9:
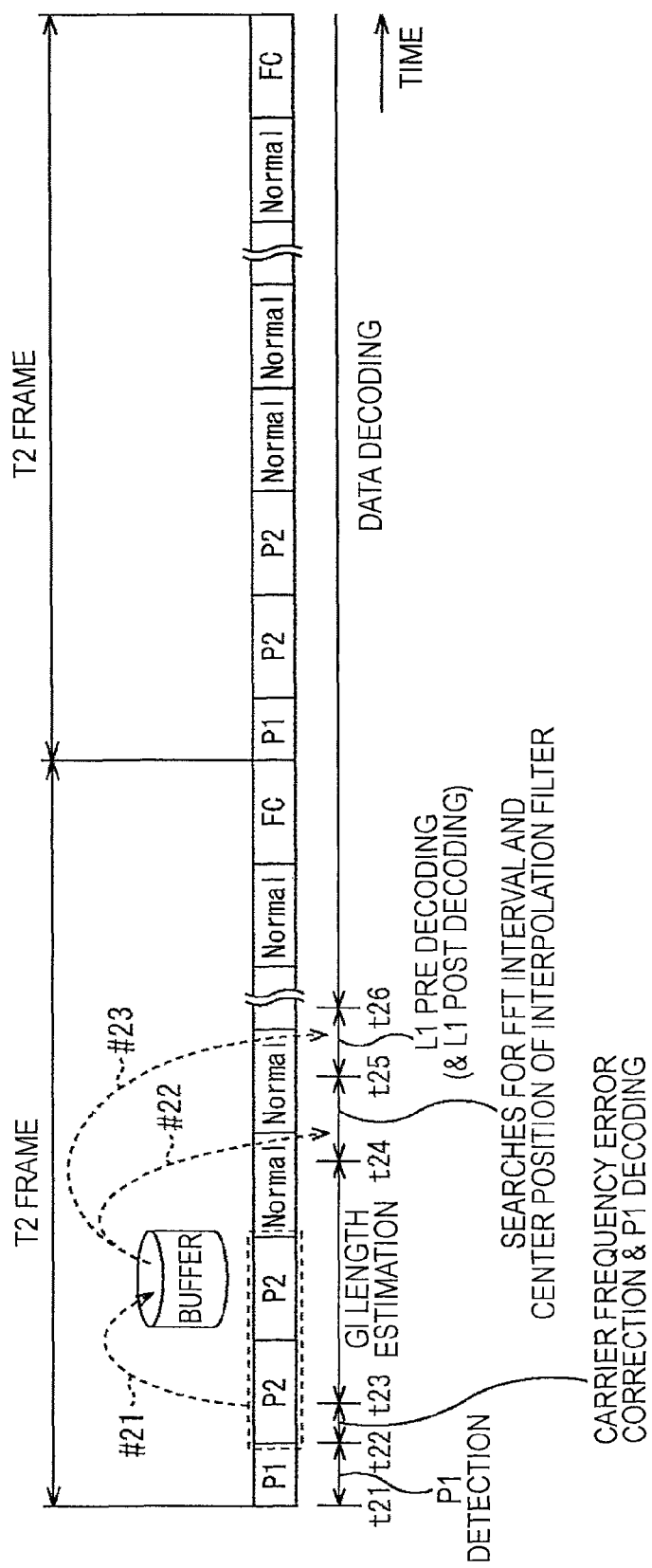
FIG. 9 is a diagram for explaining another synchronizing sequence.

FIG. 9 is a diagram for explaining another synchronizing sequence of operations to be performed by the receiving device 1. Explanation of the same operations as those described with reference to FIG. 4 will not be repeated herein.

The receiving device 1 detects a P1 symbol at the start of an operation. In the example illustrated in FIG. 9, the P1 symbol is detected in the period between time t21 and time t22.

At time t22 after the P1 symbol is detected, the receiving device 1 starts accumulating the data equivalent to P2 symbols in the buffer 29 immediately after the P1 symbol, as indicated by the arrow #21. At the same time as the accumulation of data in the buffer 29, the receiving device 1 also corrects a carrier frequency error and decodes P1 signaling. In the example illustrated in FIG. 9, at the same time as the operation to accumulate data in the buffer 29, the carrier frequency error correction and the P1 Signaling decoding are performed in the period between time t22 and time t23.

After decoding P1 Signaling, the receiving device 1 determines the data amount equivalent to the P2 symbols based on the FFT size recognized from the decoding of P1 signaling. When accumulating the P2 write amount of data in the buffer, the receiving device 1 ends the accumulation of data in the buffer.

After decoding P1 Signaling, the receiving device 1 also estimates the GI length by using the rest of the symbols, at the same time as the operation to accumulate data in the buffer 29. In the example illustrated in FIG. 9, the GI length estimation is performed in the period between time t23 and time t24.

At time t24 at which the GI estimation is completed, the receiving device 1 reads the P2 symbol data accumulated in the buffer 29, as indicated by the arrow #22. Based on the P2 symbol signal read from the buffer 29, the receiving device 1 also searches for the optimum FFT interval and the optimum center position of the filter passband of the interpolation filter used in equalization. In the example illustrated in FIG. 9, the searches for the optimum FFT interval and the optimum center position of the filter passband of the interpolation filter are conducted in the period between time t24 and t25.

At time t25 at which the searches for the optimum FFT interval and the optimum center position of the filter passband of the interpolation filter are completed, the receiving device 1 again reads the P2 symbol data accumulated in the buffer 29, as indicated by the arrow #23.

The receiving device 1 performs carrier frequency error correction on the P2 symbol signal, which is re-read from the buffer 29, and performs a FFT operation and equalization. The receiving device 1 performs the FFT operation on the re-read P2 symbol signal by using the optimum FFT interval determined through the search. The receiving device 1 also performs equalization on the re-read P2 symbol signal (the frequency-range OFDM signal subjected to the FFT operation) by using the optimum center position of the filter passband determined through the search.

That is, the receiving device 1 performs the FFT operation on the signals existing within the optimum FFT interval in the re-read P2 symbol signal. The receiving device 1 also estimates the channel characteristics of each predetermined subcarrier by extracting a SP signal. When performing interpolation on the estimated channel characteristics in the frequency direction, the receiving device 1 sets the optimum center position at the center position of the filter passband of the interpolation filter, and then performs channel characteristics interpolation.

The receiving device 1 also decodes L1PRE and L1POST from the equalized P2 symbol signal. In the example illustrated in FIG. 9, the decoding of L1PRE and L1POST is performed in the period between time t25 and time t26.

When succeeding in decoding L1PRE and L1POST, the receiving device 1 starts demodulating the data symbols after time t26 at which the decoding of L1PRE and L1POST is completed, by using the information contained in the decoded L1PRE and L1POST.

Accordingly, without having to await the next T2 frame, L1PRE and L1POST can be decoded based on the data accumulated in the buffer 29, and high-speed synchronization can be realized.

Also, the P2 symbol demodulation can be performed by using the optimum FFT interval and the optimum center position of the filter passband, and synchronization performance can be improved. In the OFDM symbol demodulation, the FFT interval to be subjected to the FFT operation and the center position of the filter passband of the interpolation filter used in the interpolation performed on the channel characteristics are parameters that determine reception performance.

In the above described synchronizing sequence, demodulation of the P2 symbols is started immediately after the P1 symbol is detected. That is, the P2 symbols are the first symbols to be demodulated in a state where P1 Signaling, which is the information necessary for decoding L1PRE, has been decoded.

Searching for a FFT interval and the center position of the filter passband of an interpolation filter normally takes an operation time equivalent to several symbols. Therefore, in a case where demodulation of the P2 symbols is started immediately after the P1 symbol is detected, those parameters cannot be set at optimum values at the start of the P2 symbol demodulation, and reception performance is degraded when there is multipath interference, for example. This results in unsuccessful L1PRE decoding. Unsuccessful L1PRE decoding means poor synchronization performance.

Figure 10:
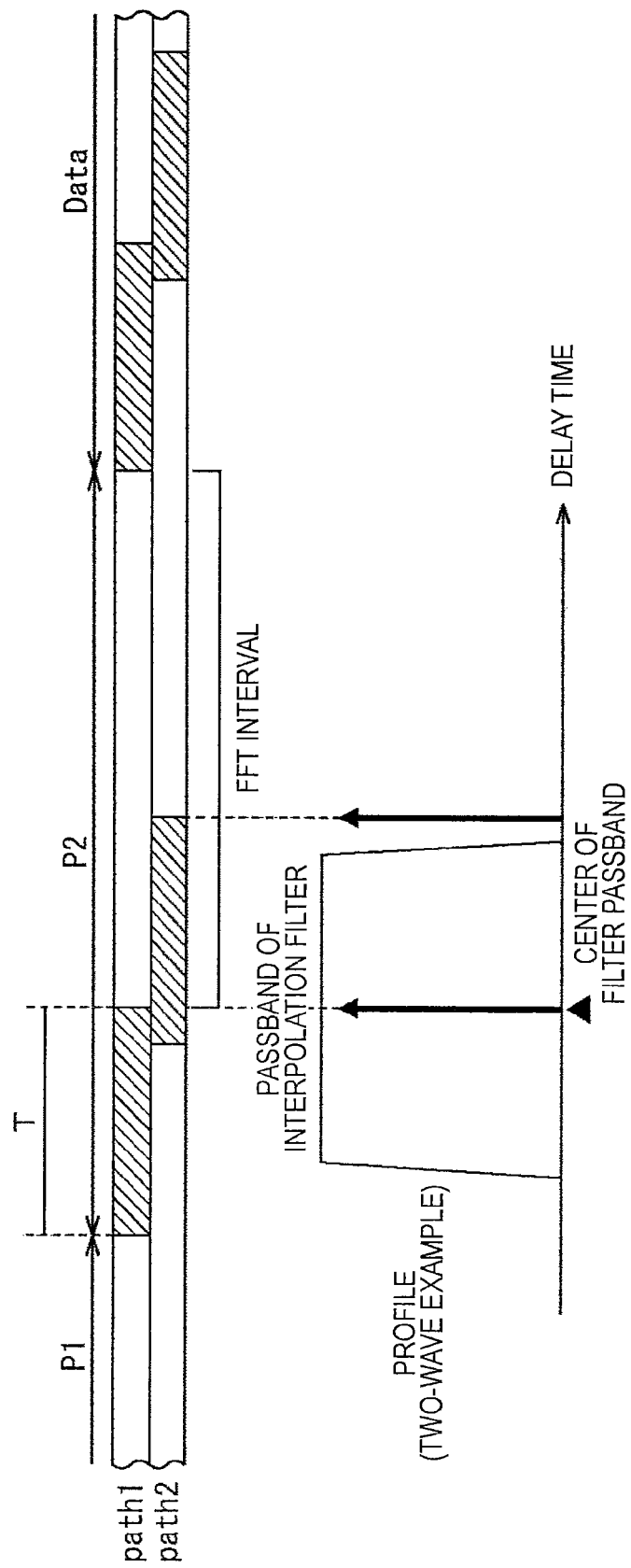
FIG. 10 is a diagram showing an example of a FFT interval and the filter passband of an interpolation filter.

FIG. 10 is a diagram showing example settings of a FFT interval and the center position of the filter passband of an interpolation filter.

The upper half of FIG. 10 shows a time-domain signal of a P2 symbol transmitted through a path 1, and a time-domain signal of a P2 symbol transmitted through a path 2. The intervals indicated by shaded portions are the GI intervals. The transverse direction represents time.

The lower half of FIG. 10 shows the filter passband of the interpolation filter. The abscissa axis indicates delay time. The left upward arrow shown on the abscissa axis represents the path 1, and the right upward arrow represents the path 2. The distance between the path 1 and the path 2 is equivalent to the delay time shown in the upper half of FIG. 10.

As shown in the lower half of FIG. 10, in a case where the center position of the filter passband of the interpolation filter is set in accordance with the position of the path 1, the filter passband does not include the path 2, and therefore, correct interpolation cannot be performed on the channel characteristics at the time of equalization.

As described above, the optimum FFT interval and the optimum center position of the filter passband of the interpolation filter are determined based on the data accumulated in the buffer 29, and P2 symbol demodulation can be precisely performed by using the determined FFT interval and center position.

Figure 11:
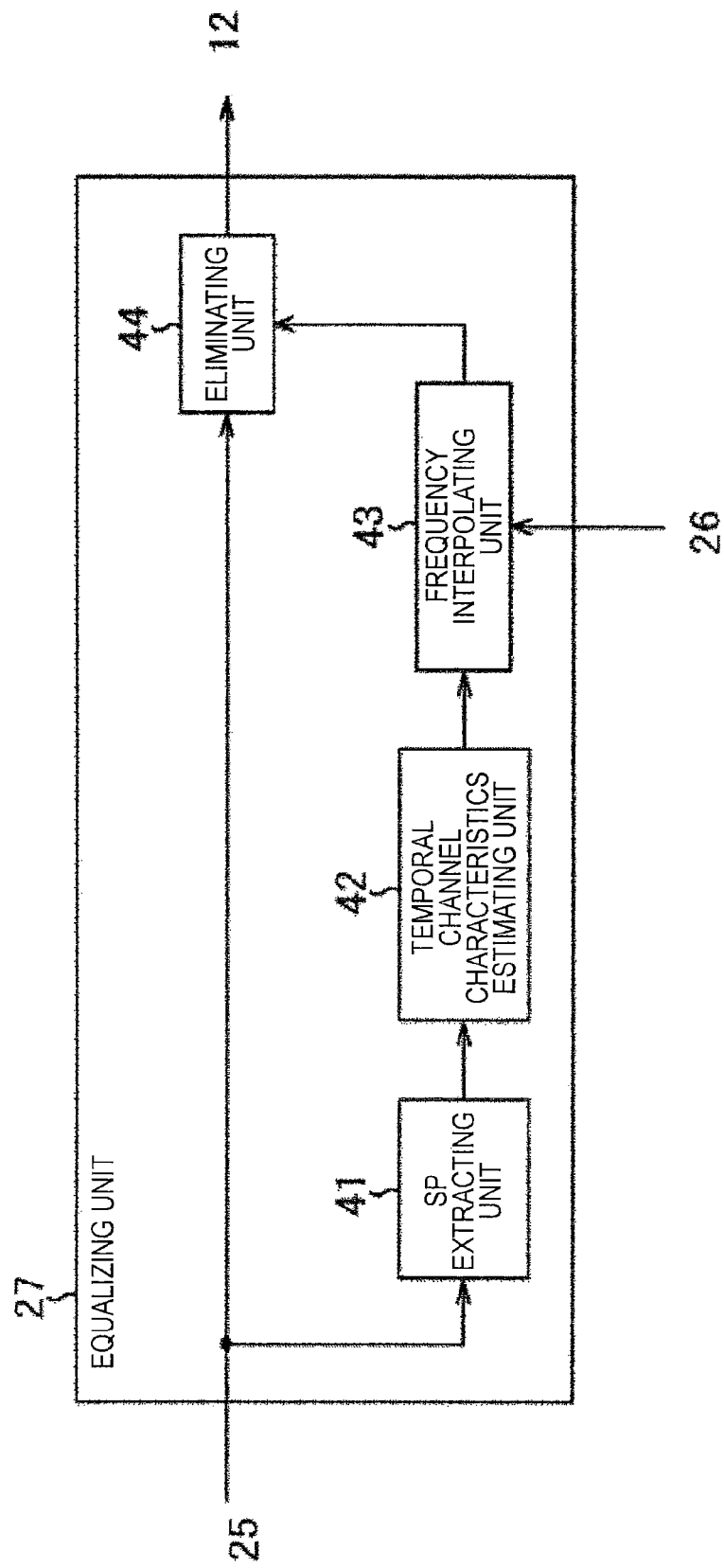
FIG. 11 is a block diagram showing an example structure of the equalizing unit.

FIG. 11 is a block diagram showing an example structure of the equalizing unit 27.

The equalizing unit 27 includes a SP extracting unit 41, a temporal channel characteristics estimating unit 42, a frequency interpolating unit 43, and an eliminating unit 44.

The SP extracting unit 41 extracts a SP signal from a frequency-range OFDM signal supplied from the FFT operation unit 25, and estimates the channel characteristics of the subcarrier at the location of the SP signal by eliminating the modulated component of the SP signal. The SP extracting unit 41 outputs a signal indicating the estimated channel characteristics to the temporal channel characteristics estimating unit 42.

Based on the channel characteristics estimated by the SP extracting unit 41, the temporal channel characteristics estimating unit 42 estimates the channel characteristics of the subcarrier accompanying a SP signal at the location of each of the OFDM symbols aligned in the temporal direction (OFDM symbol direction). The temporal channel characteristics estimating unit 42 outputs a signal indicating the estimated channel characteristics to the frequency interpolating unit 43.

The frequency interpolating unit 43 performs an interpolating operation on channel characteristics in the frequency direction, and estimates the channel characteristics of the subcarrier at the location of each of the OFDM symbols aligned in the frequency direction, from the channel characteristics supplied from the temporal channel characteristics estimating unit 42. The frequency interpolating unit 43 is provided with an interpolation filter having a predetermined filter bandwidth, and performs an interpolating operation by using this interpolation filter. The center position of the filter passband of the interpolation filter is set by the FFT interval/filter center position searching unit 26.

As a result, the channel characteristics of all the subcarriers at the locations of the respective OFDM symbols are estimated. The frequency interpolating unit 43 outputs a signal indicating the results of the estimation of channel characteristics to the eliminating unit 44.

The eliminating unit 44 eliminates the component of the signal indicating the channel characteristics of all the subcarriers supplied from the frequency interpolating unit 43, from the frequency-range OFDM signal supplied from the FFT operation unit 25. In this manner, components of distortions caused by transmission channels are removed from the frequency-range OFDM signal. The eliminating unit 44 outputs the equalized frequency-range OFDM signal having the distortion components removed therefrom, to the error correcting unit 12.

Figure 12:
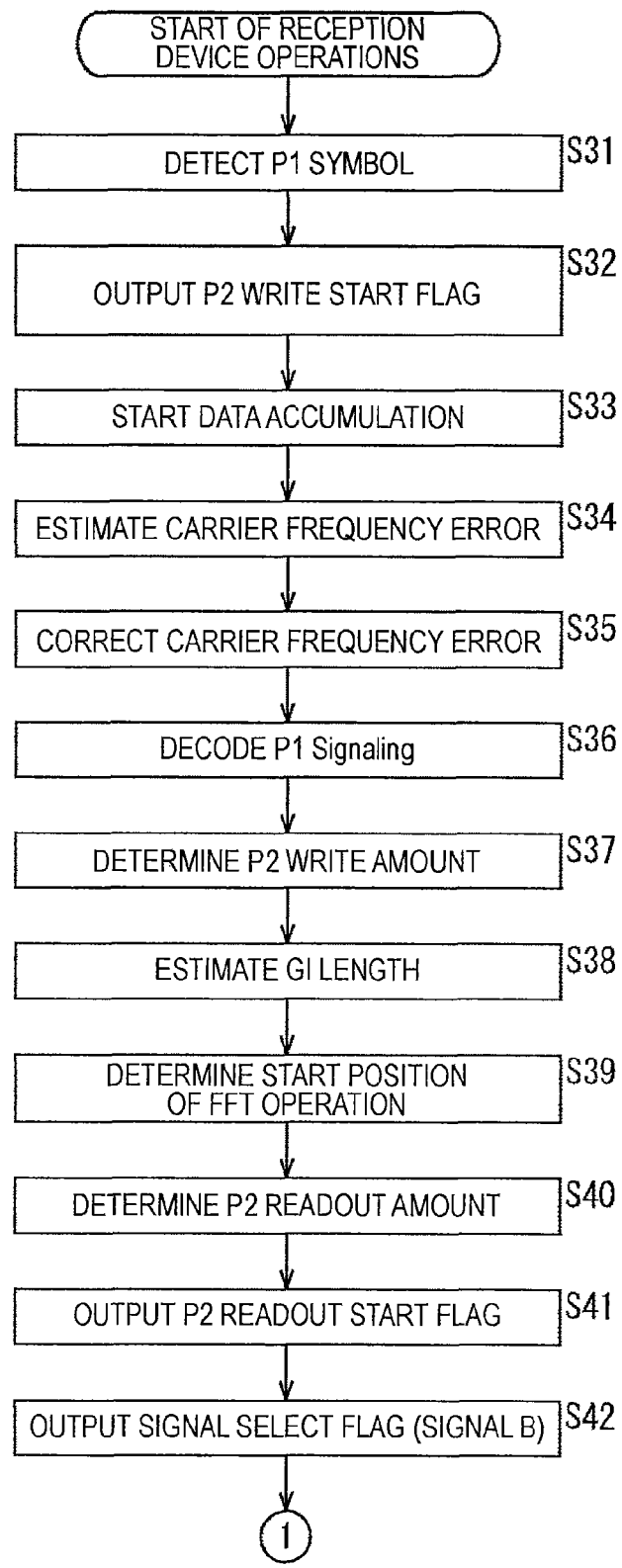
FIG. 12 is a flowchart for explaining other operations of the receiving device.
Figure 13:
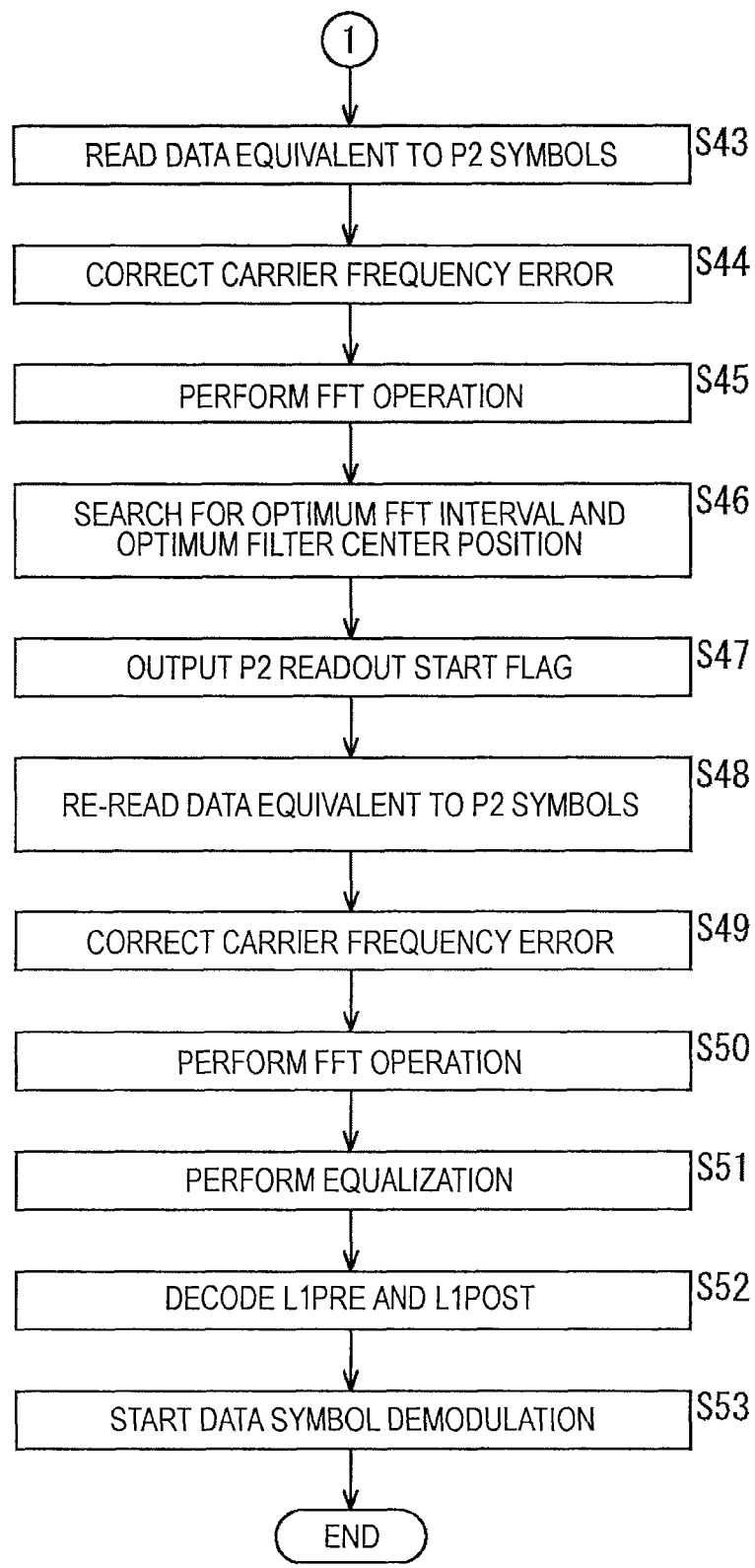
FIG. 13 is a flowchart for explaining other operations of the receiving device, continued from FIG. 12.

Referring now to the flowchart shown in FIGS. 12 and 13, operations to be performed by the receiving device 1 to establish synchronization according to the synchronizing sequence shown in FIG. 9 are described.

The operations in steps S31 through S45 are the same as the operations in steps S1 through S15 shown in FIGS. 7 and 8. The explanations that have already been made will not be repeated. The operation in each step is performed in parallel with the operation of another step, or is performed before or after the operation of another step, where appropriate.

In step S31, the P1 processing/carrier frequency error estimating unit 23 detects a P1 symbol from a time-domain OFDM signal.

In step S32, the buffer control unit 30 outputs a P2 write start flag to the buffer 29.

In step S33, the buffer 29 starts accumulating the time-domain OFDM signal that is input from outside.

In step S34, the P1 processing/carrier frequency error estimating unit 23 estimates a carrier frequency error based on the time-domain OFDM signal, and outputs the carrier frequency error amount to the carrier frequency error correcting unit 22.

In step S35, the carrier frequency error correcting unit 22 corrects the carrier frequency error contained in the time-domain OFDM signal in accordance with the carrier frequency error amount supplied from the P1 processing/carrier frequency error estimating unit 23.

In step S36, the P1 processing/carrier frequency error estimating unit 23 decodes P1 Signaling from the detected P1 symbol of the first T2 frame, and outputs FFT size information.

In step S37, the buffer control unit 30 determines a P2 write amount by using the FFT size recognized by the P1 processing/carrier frequency error estimating unit 23, and outputs the information about the P2 write amount to the buffer 29. The accumulation of the time-domain OFDM signal by the buffer 29 is continued until the amount of data equivalent to the P2 write amount has been accumulated.

In step S38, the GI estimating unit 28 estimates the GI length based on the time-domain OFDM signal supplied from the carrier frequency error correcting unit 22.

In step S39, the symbol synchronizing unit 24 determines the start position of a P2 symbol FFT operation based on the position of the P1 symbol detected by the P1 processing/carrier frequency error estimating unit 23 and the GI length estimated by the GI estimating unit 28.

In step S40, the buffer control unit 30 determines a P2 readout amount based on the FFT size recognized by the P1 processing/carrier frequency error estimating unit 23 and the GI length estimated by the GI estimating unit 28.

In step S41, the buffer control unit 30 outputs the information about the P2 readout amount, together with a P2 readout start flag, to the buffer 29.

In step S42, the buffer control unit 30 outputs a signal select flag indicating selection of a time-domain OFDM signal that is read from the buffer 29, to the signal selecting unit 21.

In step S43, the buffer 29 starts reading out the accumulated time-domain OFDM signal. The readout of the time-domain OFDM signal by the buffer 29 is continued until the OFDM signal equivalent to the P2 readout amount has been read out.

In step S44, the carrier frequency error correcting unit 22 corrects the carrier frequency error contained in the P2 symbol signal read from the buffer 29.

In step S45, the FFT operation unit 25 performs a FFT operation on the P2 symbol signal having the carrier frequency error corrected, and outputs a frequency-range P2 symbol signal.

In step S46, based on the P2 symbol signal supplied from the FFT operation unit 25, the FFT interval/filter center position searching unit 26 searches for the optimum FFT interval and the optimum center position of the filter passband of the interpolation filter. The FFT interval/filter center position searching unit 26 outputs the information about the FFT interval determined through the search to the symbol synchronizing unit 24, and outputs the information about the center position of the filter passband of the interpolation filter to the equalizing unit 27. When the searches for the optimum FFT interval and the optimum center position of the filter passband of the interpolation filter are completed, the FFT interval/filter center position searching unit 26 outputs an optimum FFT interval/filter center position search completion flag to the buffer control unit 30, as indicated by the dashed-line arrow in FIG. 6.

In step S47, in response to the optimum FFT interval/filter center position search completion flag supplied from the FFT interval/filter center position searching unit 26, the buffer control unit 30 again outputs the information about the P2 readout amount, together with the P2 readout start flag, to the buffer 29.

In step S48, the buffer 29 again starts reading out the accumulated time-domain OFDM signal. The readout of the time-domain OFDM signal by the buffer 29 is continued until the OFDM signal equivalent to the P2 readout amount has been read out.

In step S49, the carrier frequency error correcting unit 22 corrects the carrier frequency error contained in the P2 symbol signal read from the buffer 29.

In step S50, the FFT operation unit 25 performs a FFT operation on the P2 symbol signal having the carrier frequency error corrected, and outputs a frequency-range P2 symbol signal. Here, the FFT operation unit 25 sets the optimum FFT interval determined through the search conducted by the FFT interval/filter center position searching unit 26, and then performs the FFT operation.

In step S51, the equalizing unit 27 performs equalization on the P2 symbol signal supplied from the FFT operation unit 25. Here, the equalizing unit 27 sets the center position of the filter passband of the interpolation filter, which is the optimum center position determined through the search conducted by the FFT interval/filter center position searching unit 26. The equalizing unit 27 then performs interpolation on the channel characteristics, and performs equalization.

In step S52, the error correcting unit 12 decodes L1PRE and L1POST from the equalized P2 symbol signal. When having successfully decoded L1PRE and L1POST, the error correcting unit 12 outputs a successful L1PRE/L1POST decoding flag.

In step S53, the signal processing unit 11 starts demodulating the data symbols contained in the first T2 frame, using the information obtained through the decoding of L1PRE and L1POST.

Through the above described operations, synchronization can be promptly established, and synchronization performance can be improved.

In the above description, the search for the optimum FFT interval and the search for the optimum center position of the filter passband of the interpolation filter are conducted. However, only one of the searches may be conducted by the FFT interval/filter center position searching unit 26.

The data accumulated in the buffer 29 is used in the search for the optimum FFT interval and the search for the optimum center position of the filter passband of the interpolation filter, but may be used in other operations. The number of times the data accumulated in the buffer 29 is read is not fixed, and the data may be read every time an operation is performed, for example.

[Examples of Applications in Receiving Systems]

Figure 14:
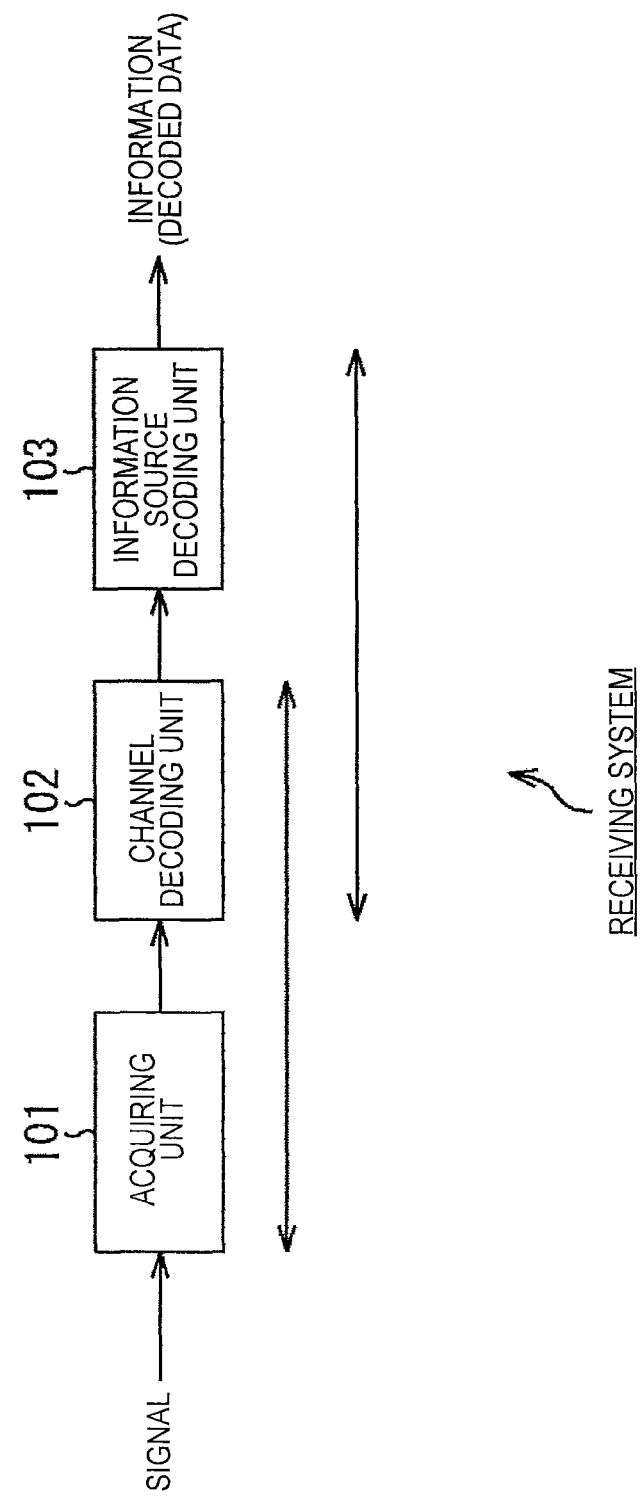
FIG. 14 is a block diagram showing an example structure of a first embodiment of a receiving system.

FIG. 14 is a block diagram showing an example structure of a first embodiment of a receiving system in which the signal processing unit 11 is used.

The receiving system shown in FIG. 14 includes an acquiring unit 101, a channel decoding unit 102, and an information source decoding unit 103.

The acquiring unit 101 acquires a signal via a transmission channel (not shown) of a network such as digital terrestrial broadcasting, digital satellite broadcasting, a CATV network, or the Internet, and supplies the signal to the channel decoding unit 102. The signal processing unit 11 shown in FIG. 6 is included in the acquiring unit 101, for example.

The channel decoding unit 102 performs a channel decoding operation including error correction on the signal acquired by the acquiring unit 101 via a transmission channel, and supplies the resultant signal to the information source decoding unit 103.

The information source decoding unit 103 performs an information source decoding operation on the signal subjected to the channel decoding operation. The information source decoding operation includes an operation to expand compressed information to the original information and acquire data to be transmitted.

Specifically, the signal acquired by the acquiring unit 101 via a transmission channel might have been subjected to compression encoding for compressing information to reduce the amount of data such as images and sound. In such a case, the information source decoding unit 103 performs an information source decoding operation, such as an operation to expand the compressed information to the original information, on the signal subjected to the channel decoding operation.

In a case where the signal acquired by the acquiring unit 101 via a transmission channel has not been subjected to compression encoding, the information source decoding unit 103 does not perform an operation to expand the compressed information to the original information. Here, the expanding operation may be MPEG decoding, for example. The information source decoding operation may also include descrambling, as well as the expanding operation.

The receiving system shown in FIG. 14 can be used in a television tuner that receives digital television broadcasts, for example. Each of the acquiring unit 101, the channel decoding unit 102, and the information source decoding unit 103 can be formed as one independent device (hardware (such as an IC (Integrated Circuit)) or a software module).

Alternatively, the three units of the acquiring unit 101, the channel decoding unit 102, and the information source decoding unit 103 can be formed as one independent device. The acquiring unit 101 and the channel decoding unit 102 can also be formed as one independent device, and the channel decoding unit 102 and the information source decoding unit 103 can also be formed as one independent device.

Figure 15:
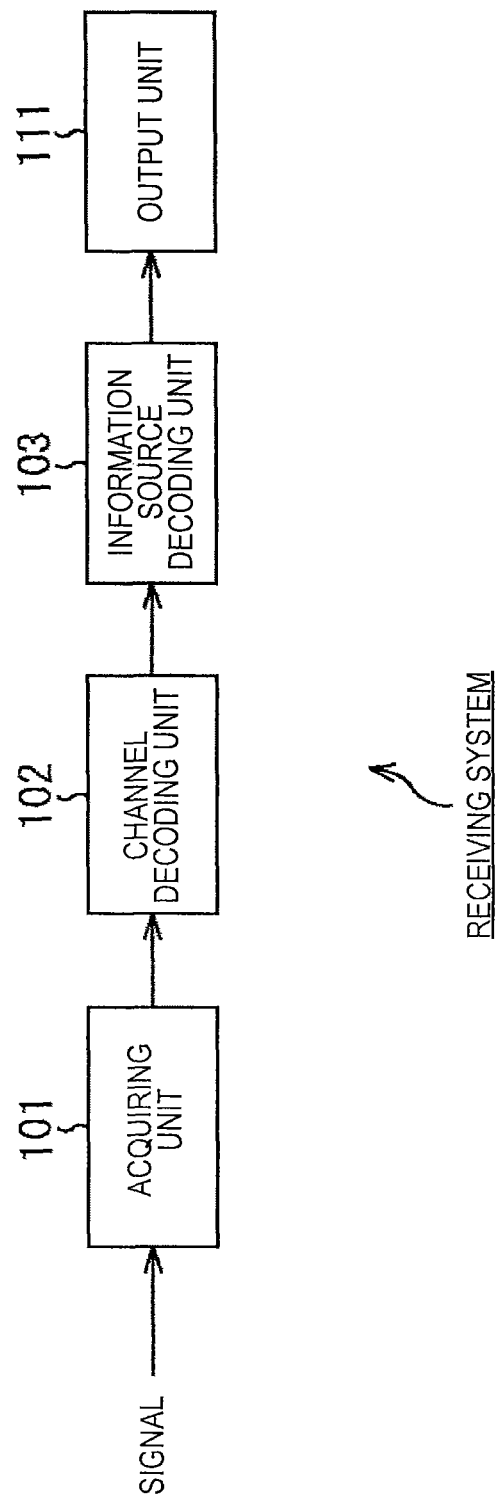
FIG. 15 is a block diagram showing an example structure of a second embodiment of a receiving system.

FIG. 15 is a block diagram showing an example structure of a second embodiment of a receiving system in which the signal processing unit 11 is used.

In the structure shown in FIG. 15, the components equivalent to the components shown in FIG. 14 are denoted by the same reference numerals as those in FIG. 14, and explanation of them will not be repeated.

The structure of the receiving system shown in FIG. 15 is the same as the structure shown in FIG. 14 in including the acquiring unit 101, the channel decoding unit 102, and the information source decoding unit 103, and differs from the structure shown in FIG. 14 in further including an output unit 111.

The output unit 111 is a display device that displays images or a speaker that outputs sound, for example. The output unit 111 outputs images or sound as signals that are output from the information source decoding unit 103. That is, the output unit 111 displays images, or outputs sound.

The receiving system shown in FIG. 15 can be used in a television receiver that receives television broadcasts as digital broadcasts, or in a radio receiver that receives radio broadcasts, for example.

In a case where a signal acquired by the acquiring unit 101 has not been subjected to compression encoding, the signal that is output from the channel decoding unit 102 is supplied directly to the output unit 111.

Figure 16:
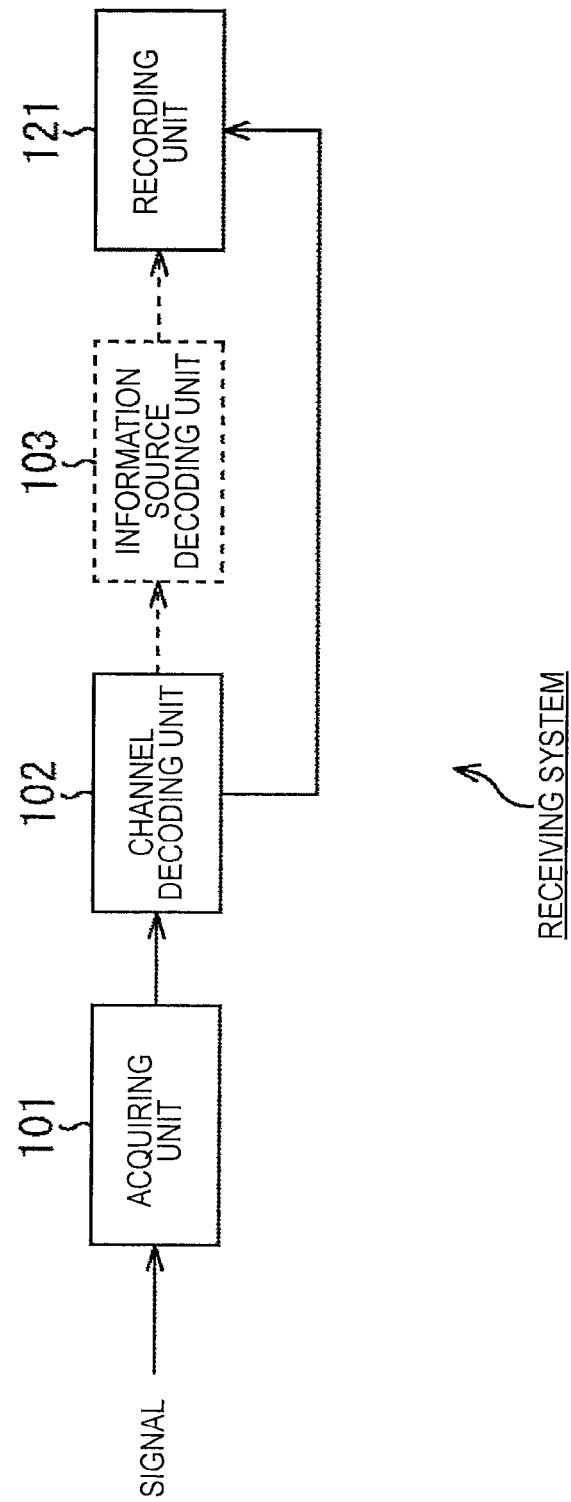
FIG. 16 is a block diagram showing an example structure of a third embodiment of a receiving system.

FIG. 16 is a block diagram showing an example structure of a third embodiment of a receiving system in which the signal processing unit 11 is used.

In the structure shown in FIG. 16, the components equivalent to the components shown in FIG. 14 are denoted by the same reference numerals as those in FIG. 14, and explanation of them will not be repeated.

The structure of the receiving system shown in FIG. 16 is the same as the structure shown in FIG. 14 in including the acquiring unit 101 and the channel decoding unit 102, and differs from the structure shown in FIG. 14 in not including the information source decoding unit 103 but further including a recording unit 121.

The recording unit 121 records (stores) signals (such as TS packets of MPEG TS) that are output from the channel decoding unit 102, on a recording (storage) medium such as an optical disk, a hard disk (a magnetic disk), or a flash memory.

The above described receiving system shown in FIG. 16 can be used in a recorder apparatus or the like that records television broadcasts.

The information source decoding unit 103 may be added, and signals subjected to the information source decoding operation at the information decoding unit 103, or images or sound obtained by decoding, may be recorded by the recording unit 121.

[Example Structure of a Computer]

The above described series of operations can be performed by hardware, and can also be performed by software. In a case where the series of operations are performed by software, the program of the software is installed from a program recording medium into a computer incorporated into special-purpose hardware or a general-purpose personal computer, for example.

FIG. 17 is a block diagram showing an example structure of the hardware of a computer that performs the above described series of operations in accordance with a program.

A CPU (Central Processing Unit) 151, a ROM (Read Only Memory) 152, a RAM (Random Access Memory) 153 are connected to one another by a bus 154.

An input/output interface 155 is further connected to the bus 154. An input unit 156 formed with a keyboard, a mouse, and the like, and an output unit 157 formed with a display, a speaker, and the like are connected to the input/output interface 155. A storage unit 158 formed with a hard disk or a nonvolatile memory, a communication unit 159 formed with a network interface or the like, and a drive 160 driving a removable medium 161 are also connected to the input/output interface 155.

In the computer having the above described structure, the CPU 151 loads a program stored in the storage unit 158 into the RAM 153 via the input/output interface 155 and the bus 154, for example, and executes the program, so that the above described series of operations are performed.

The program to be executed by the CPU 151 is recorded in the removable medium 161, for example, or is provided via wired or wireless transmission medium such as a local area network, the Internet, or digital broadcasting, and is installed into the storage unit 158.

The program to be executed by the computer may be a program for carrying out processes in chronological order in accordance with the sequence described in this specification, or a program for carrying out processes in parallel or whenever necessary such as in response to a call.

It should be noted that embodiments of the present technique are not limited to the above described embodiments, and various modifications may be made to them without departing from the scope of the present technique.

[Other Modifications]

The present technique may be provided in the following forms.

(1)

A receiving device including:

a detecting unit that detects a first preamble signal from a frame signal having a frame structure that contains the first preamble signal indicating a frame partition, a second preamble signal containing control information to be used in processing a data signal, and the data signal, the second preamble signal being transmitted after the first preamble signal;

an accumulating unit that accumulates the second preamble signal when the first preamble signal is detected; and a processing unit that processes the data signal based on the control information contained in the second preamble signal accumulated in the accumulating unit, the data signal being contained in the same frame as the second preamble signal accumulated in the accumulating unit.

(2)

The receiving device of (1), wherein the accumulating unit accumulates the amount of data equivalent to the largest possible data amount as the data amount of the second preamble signal, the data being located immediately after the first preamble signal.

(3)

The receiving device of (1) or (2), wherein the frame signal is a signal of a T2 frame compliant with DVB-T2, the first preamble signal is a signal of a P1 symbol, the second preamble signal is a signal of a P2 symbol, and the data signal is a signal of a data symbol.

(4)

The receiving device of (3), further including:

an estimating unit that estimates the GI length of the symbols forming the T2 frame based on part of the signal of the T2 frame; and a control unit that determines the data amount of the P2 symbol based on the FFT size indicated by information contained in the P1 symbol and the GI length estimated by the estimating unit, and reads a signal having the determined data amount as the signal of the P2 symbol from the accumulating unit.

(5)

The receiving device of (4), wherein the processing unit includes:

a FFT operation unit that performs a FFT operation on the signal of the P2 symbol read from the accumulating unit, the start position of the FFT operation being a position that is behind the position of the P1 symbol by the GI length estimated by the estimating unit, the FFT interval being an interval that starts from the start position and has a size equivalent to the FFT size;

an equalizing unit that performs equalization on the signal of the P2 symbol of a frequency range obtained through the FFT operation; and a decoding unit that decodes L1PRE Signaling and L1POST Signaling from the equalized signal of the P2 symbol.

(6)

The receiving device of (5), further including a searching unit that searches for the FFT interval based on the signal of the P2 symbol of the frequency range, wherein, when the search by the searching unit is completed, the control unit re-reads the signal of the P2 symbol from the accumulating unit, and the FFT operation unit performs the FFT operation on the signal within the FFT interval detected by the search, the signal within the FFT interval being of the re-read signal of the P2 symbol.

(7)

The receiving device of (5) or (6), wherein the equalizing unit includes:

a channel characteristics estimating unit that extracts a pilot signal from the signal of the P2 symbol of the frequency range, and estimates the channel characteristics of the subcarrier at the location of the pilot signal;

an interpolating unit that performs interpolation on the channel characteristics estimated by the channel characteristics estimating unit, using an interpolation filter; and a correcting unit that corrects a distortion of the signal of the P2 symbol of the frequency range based on the channel characteristics of all the subcarriers determined through the interpolation performed by the interpolating unit, the receiving device further includes a searching unit that searches for the center position of the filter passband of the interpolation filter based on the signal of the P2 symbol of the frequency range, when the search by the searching unit is completed, the control unit re-reads the signal of the P2 symbol from the accumulating unit, the FFT operation unit performs the FFT operation on the re-read signal of the P2 symbol, and the interpolating unit performs the interpolation on the channel characteristics, with the center position of the filter passband of the interpolation filter being the center position detected by the searching unit.

(8)

A receiving method including the steps of:

detecting a first preamble signal from a frame signal having a frame structure that contains the first preamble signal indicating a frame partition, a second preamble signal containing control information to be used in processing a data signal, and the data signal, the second preamble signal being transmitted after the first preamble signal;

accumulating the second preamble signal when the first preamble signal is detected; and processing the data signal based on the control information contained in the accumulated second preamble signal, the data signal being contained in the same frame as the accumulated second preamble signal.

(9)

A program for causing a computer to perform an operation that includes the steps of:

detecting a first preamble signal from a frame signal having a frame structure that contains the first preamble signal indicating a frame partition, a second preamble signal containing control information to be used in processing a data signal, and the data signal, the second preamble signal being transmitted after the first preamble signal;

accumulating the second preamble signal when the first preamble signal is detected; and processing the data signal based on the control information contained in the accumulated second preamble signal, the data signal being contained in the same frame as the accumulated second preamble signal.

REFERENCE SIGNS LIST

1 Receiving device
11 Signal processing unit
12 Error correcting unit
21 Signal selecting unit
22 Carrier frequency error correcting unit
23 P1 processing/carrier frequency error correction estimating unit
24 Symbol synchronizing unit
25 FFT operation unit
26 FFT interval/filter center position searching unit
27 Equalizing unit
28 GI estimating unit
29 Buffer
30 Buffer control unit

The invention claimed is:

1. A receiving device comprising:
circuitry configured to
detect a first preamble signal from a frame signal having a frame structure that contains the first preamble signal indicating a frame partition, a second preamble signal containing control information to be used in processing a data signal, and the data signal, the second preamble signal being transmitted after the first preamble signal,
wherein
the frame signal is a signal of a T2 frame compliant with DVB-T2,
the first preamble signal is a signal of a P1 symbol,
the second preamble signal is a signal of a P2 symbol, and
the data signal is a signal of a data symbol;
accumulate the second preamble signal when the first preamble signal is detected;
process the data signal based on the control information contained in the second preamble signal accumulated, the data signal being contained in the same frame as the second preamble signal accumulated;
correct a detected carrier frequency error contained in the frame signal;
estimate a guard interval (GI) length of the symbols forming the corrected frame signal based on part of the frame signal;
determine the data amount of the P2 symbol based on a Fast Fourier Transform (FFT) size indicated by information contained in the P1 symbol and the GI length estimated by the circuitry; and
read a signal having the determined data amount as the signal of the P2 symbol.

2. The receiving device according to claim 1, wherein the circuitry accumulates an amount of data equivalent to the largest possible data amount as a data amount of the second preamble signal, the data being located immediately after the first preamble signal.

3. The receiving device according to claim 1, wherein the circuitry is further configured to:
perform a FFT operation on the read signal of the P2 symbol, a start position of the FFT operation being a position that is behind the position of the P1 symbol by the GI length estimated by the circuitry, an FFT interval being an interval that starts from the start position and has a size equivalent to the FFT size;
perform equalization on the signal of the P2 symbol of a frequency range obtained through the FFT operation; and
decode L1PRE Signaling and L1POST Signaling from the equalized signal of the P2 symbol.

4. The receiving device according to claim 3, wherein the circuitry is further configured to:
search for the FFT interval based on the signal of the P2 symbol of the frequency range,
wherein,
when the search is completed, the circuitry re-reads the signal of the P2 symbol, and
the circuitry performs the FFT operation on the signal within the FFT interval detected by the search, the signal within the FFT interval being of the re-read signal of the P2 symbol.

5. The receiving device according to claim 3, wherein the circuitry is further configured to:
extract a pilot signal from the signal of the P2 symbol of the frequency range, and estimate channel characteristics of a subcarrier at a location of the pilot signal;
perform interpolation on the channel characteristics estimated, using an interpolation filter;
correct a distortion of the signal of the P2 symbol of the frequency range based on channel characteristics of all subcarriers determined through the interpolation performed;
search for a center position of a filter passband of the interpolation filter based on the signal of the P2 symbol of the frequency range;
re-read the signal of the P2 symbol when the search is completed;
perform the FFT operation on the re-read signal of the P2 symbol; and
perform the interpolation on the channel characteristics, with the center position of the filter passband of the interpolation filter being the center position detected.

6. A receiving method comprising the steps of:
detecting, with circuitry, a first preamble signal from a frame signal having a frame structure that contains the first preamble signal indicating a frame partition, a second preamble signal containing control information to be used in processing a data signal, and the data signal, the second preamble signal being transmitted after the first preamble signal,
wherein
the frame signal is a signal of a T2 frame compliant with DVB-T2,
the first preamble signal is a signal of a P1 symbol,
the second preamble signal is a signal of a P2 symbol, and
the data signal is a signal of a data symbol;
accumulating the second preamble signal when the first preamble signal is detected;
processing the data signal based on the control information contained in the accumulated second preamble signal, the data signal being contained in the same frame as the accumulated second preamble signal;
correcting a detected carrier frequency error contained in the frame signal;
estimating a guard interval (GI) length of the symbols forming the corrected frame signal based on part of the frame signal;
determining the data amount of the P2 symbol based on a Fast Fourier Transform (FFT) size indicated by information contained in the P1 symbol and the GI length estimated by the circuitry; and
reading a signal having the determined data amount as the signal of the P2 symbol.

7. A non-transitory computer-readable medium encoded with computer-readable instructions that when executed by a processor, cause the processor to perform a method comprising:
detecting a first preamble signal from a frame signal having a frame structure that contains the first preamble signal indicating a frame partition, a second preamble signal containing control information to be used in processing a data signal, and the data signal, the second preamble signal being transmitted after the first preamble signal,
wherein
the frame signal is a signal of a T2 frame compliant with DVB-T2,
the first preamble signal is a signal of a P1 symbol,
the second preamble signal is a signal of a P2 symbol, and
the data signal is a signal of a data symbol;
accumulating the second preamble signal when the first preamble signal is detected;
processing the data signal based on the control information contained in the accumulated second preamble signal, the data signal being contained in the same frame as the accumulated second preamble signal;
correcting a detected carrier frequency error contained in the frame signal;
estimating a guard interval (GI) length of the symbols forming the corrected frame signal based on part of the frame signal;
determining the data amount of the P2 symbol based on a Fast Fourier Transform (FFT) size indicated by information contained in the P1 symbol and the GI length estimated by the circuitry; and
reading a signal having the determined data amount as the signal of the P2 symbol.

* * * * *